US009273967B2

United States Patent
Ding et al.

(10) Patent No.: US 9,273,967 B2
(45) Date of Patent: Mar. 1, 2016

(54) BIAS ESTIMATING METHOD, POSTURE ESTIMATING METHOD, BIAS ESTIMATING DEVICE, AND POSTURE ESTIMATING DEVICE

(75) Inventors: Yimei Ding, Shiojiri (JP); Shuji Uchida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 13/170,139

(22) Filed: Jun. 27, 2011

(65) Prior Publication Data

US 2011/0320164 A1    Dec. 29, 2011

(30) Foreign Application Priority Data

Jun. 28, 2010  (JP) ................................. 2010-146561

(51) Int. Cl.
*G01C 21/20* (2006.01)
*G01C 21/16* (2006.01)
*G01P 21/00* (2006.01)

(52) U.S. Cl.
CPC ................ *G01C 21/16* (2013.01); *G01P 21/00* (2013.01)

(58) Field of Classification Search
CPC ........................................................ G01C 21/20
USPC .......................................................... 702/150
See application file for complete search history.

(56) References Cited

U.S. PATENT DOCUMENTS

| 5,610,815 | A | * | 3/1997 | Gudat et al. ..................... 701/23 |
| H0001840 | H | * | 2/2000 | Carew et al. .................... 702/85 |
| 6,941,809 | B2 | * | 9/2005 | Le Roy et al. .................. 73/497 |
| 2009/0259424 | A1 | * | 10/2009 | Dutta et al. ..................... 702/85 |

FOREIGN PATENT DOCUMENTS

| JP | 10-267651 A | 10/1998 |
| JP | 2008-544216 A | 12/2008 |
| WO | WO 2006/134500 A2 | 12/2006 |
| WO | 2009/151780 A1 | 12/2009 |

* cited by examiner

*Primary Examiner* — Gregory J Toatley
*Assistant Examiner* — Terence Stifter, Jr.
(74) *Attorney, Agent, or Firm* — Kilpatrick Townsend & Stockton LLP

(57) ABSTRACT

A bias estimating method includes: calculating a virtual posture angle which is a posture angle with a bias which is assumed to be zero by the use of detection values of a plurality of axes in a calibration posture where one axis of a multi-axis acceleration sensor is parallel to the vertical direction; and estimating a bias value contained in the detection value of the axis using the detection value of the axis and the virtual posture angle.

15 Claims, 14 Drawing Sheets

BIAS ESTIMATION ERROR:SMALL
= INCLINATION OF INSTALLATION BASE: SMALL

| | | | | 85 |
|---|---|---|---|---|
| 851 — BIAS ESTIMATION ERROR | $\|\delta b_{az}\|$ | | | |

| | 853 VERTICAL AXIS | 855 ACCELERATION DETECTION VALUE | 857 VIRTUAL POSTURE ANGLE | 859 ESTIMATED BIAS VALUE |
|---|---|---|---|---|
| | X AXIS | $(f_x1, f_y1, f_z1)$ | $(\phi^i1, \theta^i1)$ | $b^i_{ax}$ |
| | Y AXIS | $(f_x2, f_y2, f_z2)$ | $(\phi^i2, \theta^i2)$ | $b^i_{ay}$ |
| | Z AXIS | $(f_x3, f_y3, f_z3)$ | $(\phi^i3, \theta^i3)$ | $b^i_{az}$ |

FIG. 10

| 871 ACCELERATION DETECTION VALUE | 873 CORRECTED ACCELERATION DETECTION VALUE | 875 ESTIMATED ATTACHMENT POSTURE |
|---|---|---|
| $(f_x, f_y, f_z)$ | $(f_x - b_{ax}, f_y - b_{ay}, f_z - b_{az})$ | $(\phi, \theta)$ |

FIG. 11

BIAS ESTIMATING METHOD, POSTURE ESTIMATING METHOD, BIAS ESTIMATING DEVICE, AND POSTURE ESTIMATING DEVICE

BACKGROUND

1. Technical Field

The present invention relates to a bias estimating method, a posture estimating method, a bias estimating device, and a posture estimating device.

2. Related Art

In various fields of so-called seamless positioning, motion sensing, posture control, and the like, inertial sensors have attracted attention. An acceleration sensor, a gyro sensor, a pressure sensor, a geomagnetic sensor, and the like are widely known as such inertial sensors.

In recent years, sensor modules equipped with a multiple-axes (multi-axis) inertial sensor have been developed. The multi-axis sensor module is provided with inertial sensors mounted on plural orthogonal axes and is configured to perform a sensing operation in a three-dimensional space. However, there is a problem in that the output of the inertial sensor contains a misalignment error due to the inaccurate attachment of the inertial sensors to the sensor module.

In view of this problem, for example, JP-A-10-267651 discloses a technique of calculating different-axis sensitivity in a multi-axis acceleration sensor and correcting the misalignment error contained in the detection value of the acceleration sensor.

According to the technique disclosed in JP-A-10-267651, the misalignment error can be satisfactorily corrected. However, the output of the acceleration sensor may typically contain a bias component called a zero bias. It is known that a bias (so-called turn-on bias) is created at the time of turning on an inertial sensor, and the bias has a random drift characteristic that it randomly varies with the passage of time.

In recent years, an MEMS (Micro Electro Mechanical System) sensor as a small and inexpensive inertial sensor employing the fine processing technology of semiconductor has been provided to various consumer products. In the MEMS sensor, a mechanical part detecting an inertial force and a conversion part converting the inertial force into an electrical signal are formed on a single silicon wafer by the use of the fine processing technology.

The MEMS sensor has merits such as small size, small weight, low cost, and low power consumption, but has a demerit that it can be easily affected by external influences such as impact, vibration, and temperature variation. The external temperature variation has a great influence on the output of the inertial sensor. A temperature compensation technique of removing a temperature-dependent component from the output of the inertial sensor has also been devised. However, even when the temperature compensation is carried out, there is a problem in that the bias value contained in the output of the inertial sensor is not zero but has a considerable magnitude due to the turn-on bias or external influences other than temperature variations.

SUMMARY

An advantage of some aspects of the invention is that it provides a new technique of estimating a bias value of an inertial sensor.

According to a first aspect of the invention, there is provided a bias estimating method including: calculating a virtual posture angle which is a posture angle with a bias which is assumed to be zero by the use of detection values of a plurality of axes in a calibration posture where one axis of a multi-axis acceleration sensor is parallel to the vertical direction; and estimating a bias value contained in the detection value of the axis using the detection value of the axis and the virtual posture angle.

According to a seventh aspect of the invention, there is provided a bias estimating device including: a virtual posture angle calculating unit that calculates a virtual posture angle which is a posture angle with a bias which is assumed to be zero by the use of detection values of a plurality of axes in a calibration posture where one axis of a multi-axis acceleration sensor is parallel to the vertical direction; and a bias estimating unit that estimates a bias value contained in the detection value of the axis using the detection value of the axis and the virtual posture angle.

According to the above-mentioned aspects, the virtual posture angle which is a posture angle with a bias which is assumed to be zero is calculated using the detection values of the plurality of axes when the multi-axis acceleration sensor has the calibration posture. The bias value contained in the detection value of the corresponding axis is estimated using the detection value of the axis parallel to the vertical direction and the virtual posture angle.

The detection values of the multi-axis acceleration sensor contain two components of a gravitational acceleration component in a detection axis direction and a bias component due to the posture of the acceleration sensor. It is difficult to specify by what ratios the detection values of the acceleration sensor contain the components. Accordingly, the virtual posture angle which is a posture angle with a bias which is assumed to be zero is calculated and then the bias value contained in the corresponding detection value is estimated using the detection value of the detection axis parallel to the vertical direction and the calculated virtual posture angle. As a result, it is possible to separate the gravitational acceleration component and the bias component and thus to appropriately estimate the bias value.

According to a second aspect of the invention, the bias estimating method may further include calculating an estimation error of the bias value using the virtual posture angle and an error variance of the bias value.

More specifically, according to a third aspect of the invention, the estimation error of the bias value contained in the detection value of the axis may be approximated using the virtual posture angle and an error in the virtual posture angle, and the calculating of the estimation error of the bias value may include calculating the estimation error of the bias value contained in the detection value of the axis on the basis of the fact that the error in the virtual posture angle can be estimated using the error variance of the bias value.

According to the third aspect, the estimation error of the bias value contained in the detection value of the axis parallel to the vertical direction is calculated on the basis of the fact that the error in the virtual posture angle can be estimated using the error variance of the bias value. When the calculated estimation error of the bias value is small, it means that the bias value close to the true bias value is estimated. Accordingly, by correcting the detection values of the acceleration sensor using the estimated bias value, it is possible to accurately calculate the acceleration.

According to a fourth aspect of the invention, the acceleration sensor used in the bias estimating method may be at least a temperature-compensated sensor.

According to the fourth aspect, since the acceleration sensor is at least a temperature-compensated sensor, a temperature-dependent bias component is reduced from the detection values of the acceleration sensor.

According to a fifth aspect of the invention, the bias estimating method may further include performing at least a temperature compensating operation to compensate for the output of the acceleration sensor and to acquire the detection value.

According to the fifth aspect, at least the temperature compensating operation is performed to compensate for the output of the acceleration sensor and to acquire the detection value. Accordingly, similarly to the fourth aspect, the temperature-dependent bias component is reduced from the detection values of the acceleration sensor.

According to a sixth aspect of the invention, there is provided a posture estimating method of estimating a posture of the acceleration sensor using the bias value estimated by the above-mentioned bias estimating method and the detection values of the axes of the acceleration sensor.

According to an eighth aspect of the invention, there is provided a posture estimating device including: a multi-axis acceleration sensor; the bias estimating device according to the seventh aspect that estimates the bias value contained in the detection values of the plurality of axes of the acceleration sensor; and a posture estimating unit that estimates a posture of the acceleration sensor using the bias value estimated by the bias estimating device and the detection values of the plurality of axes of the acceleration sensor.

According to the sixth aspect and the like, it is possible to estimate the posture of the acceleration sensor using the bias value estimated by the use of the bias estimating method and the detection values of the axes of the acceleration sensor.

BRIEF DESCRIPTION OF THE DRAWINGS

The invention will be described with reference to the accompanying drawings, wherein like numbers reference like elements.

FIG. 10 is a diagram illustrating the data structure of initial calibration data.

FIG. 11 is a diagram illustrating the data structure of initial attachment setting data.

DESCRIPTION OF EXEMPLARY EMBODIMENTS

Hereinafter, exemplary embodiments of the invention will be described with reference to the accompanying drawings. However, the invention is not limited to the following embodiments.

1. Principle

Figure 1:
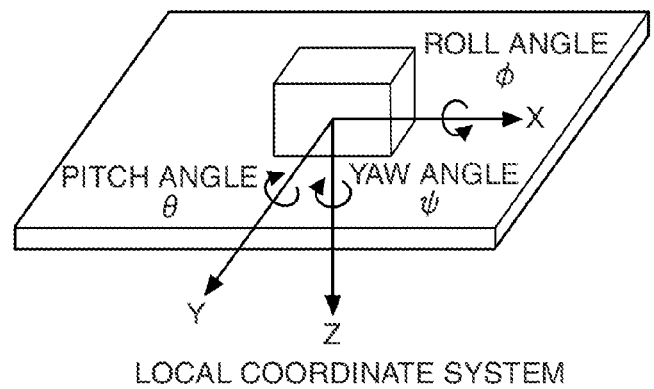
FIG. 1 is a diagram illustrating an acceleration sensor.

FIG. 1 is a diagram illustrating an acceleration sensor according to an embodiment of the invention. The acceleration sensor is a multiple-axis (multi-axis) acceleration sensor and is configured to detect accelerations in the axis directions of three predetermined axes orthogonal to each other. In the following description, the three-axis coordinate system established in the acceleration sensor is referred to as a "local coordinate system".

In this embodiment, the local coordinate system is defined as a three-dimensional orthogonal coordinate system of a right-handed system as shown in FIG. 1. The right-left direction of which the right direction is positive in FIG. 1 is defined as an X axis (roll axis), the front-rear direction of which the front direction is positive in FIG. 1 is defined as a Y axis (pitch axis), the up-down direction of which the down direction is positive in FIG. 1 is defined as a Z axis (yaw axis).

In this embodiment, the rotation angle around the X axis is defined as a roll angle "$\phi$", the rotation angle around the Y axis is defined as a pitch angle "$\theta$", and the rotation angle around the Z axis is defined as a yaw angle "$\psi$". The detection value of each detection axis in the acceleration sensor is expressed by "$f=(f_x, f_y, f_z)$" and the bias value of each detection axis in the acceleration sensor is expressed by "$b_a=(b_{ax}, b_{ay}, b_{az})$". Here, the subscript "a" represents acceleration and the subscripts "x", "y", and "z" represent the X axis, the Y axis, and the Z axis, respectively. In the following description, the gravitational acceleration is expressed by "g".

In this embodiment, it is assumed that the output of the acceleration sensor is subjected to at least a temperature compensating operation. The detection value of the acceleration sensor contains a component (hereinafter, referred to as "temperature-dependent component") dependent on the temperature, such as a zero bias, a scale factor, and secondary sensitivity. The temperature characteristics of the temperature-dependent component are acquired in the step of manufacturing the acceleration sensor and the acceleration sensor is compensated for in temperature.

The temperature compensating operation may be carried out inside or outside the acceleration sensor. That is, a temperature-compensating circuit may be provided inside the acceleration sensor and the output value of the acceleration sensor may be compensated for in temperature, or a processing circuit other than the acceleration sensor may compensate for (accurately correct) the output value of the acceleration sensor in terms of temperature.

There is a problem in that even when the acceleration sensor is subjected to the temperature compensating operation, the bias value contained in the detection value of the acceleration sensor is not completely zero but the bias value remains, due to the turn-on bias created at the time of supplying power thereto or bias components other than the temperature-dependent component. A goal of this embodiment is to estimate the magnitude of the residual bias remaining in the detection value.

It is assumed that the Z axis of the acceleration sensor is disposed in an installation base parallel to the vertical direction. In this embodiment, it is also assumed that the acceleration sensor does not have any misalignment error. For the purpose of ease of explanation, it is also assumed that the XZ plane including the X axis and the Z axis is viewed from the positive direction of the Y axis.

Figure 2:
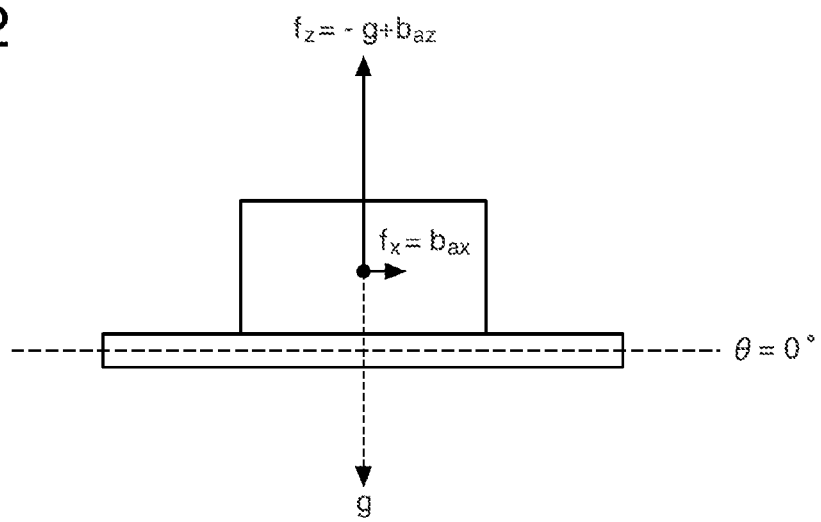
FIG. 2 is a diagram illustrating an example where an installation surface is horizontal.

In a stationary state, when the installation base is completely horizontal ($\theta=\phi=0$), only the gravitational force in the vertical direction is applied to the acceleration sensor, as shown in FIG. 2. The acceleration sensor is designed to detect the external force other than the gravitational force and detects a normal force from the installation base in this case. Accordingly, the detection value of the Z axis of the acceleration sensor is ideally "$-g$" ($f_z=-g$). However, since the bias value "$b_{az}$" of the Z axis exists, the actual detection value is "$f_z=-g+b_{az}$".

Since the acceleration in the X axis direction is ideally zero but the bias value "$b_{ax}$" of the X axis is superposed on the detection value, the detection value of the X axis is "$f_x=b_{ax}$".

Figure 3:
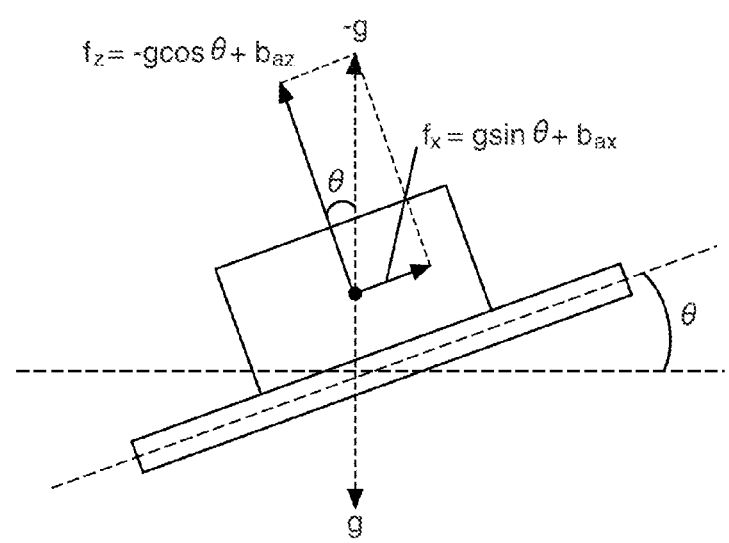
FIG. 3 is a diagram illustrating an example where the installation surface is inclined.

On the other hand, when the installation base is slightly inclined, this example can be the same as shown in FIG. 3. That is, for example, as shown in FIG. 3, when the installation base is inclined by "$\theta$" in the pitch direction, the X-axis component and the Z-axis component are created in the gravitation acceleration. Accordingly, in consideration of the normal force, the detection value of the X axis of the acceleration sensor is "$f_x=g\cdot\sin\theta+b_{ax}$" and the detection value of the Z axis is "$f_z=-g\cdot\cos\theta+b_{az}$".

There is no problem in a situation where a completely-horizontal installation base can be prepared. However, when the installation base is slightly inclined, the gravitational acceleration has an influence on the detection value of each detection axis as shown in FIG. 3. In this embodiment, a situation where the bias value is estimated in an actual environment after the product shipment is assumed as well as a situation where the bias value is estimated in an experiment environment before the product shipment. In the actual environment, it cannot be said that the completely-horizontal installation base is prepared. Therefore, the inventor considered that the bias of the acceleration sensor is estimated in an environment where a substantially-horizontal installation base can be prepared.

1-1. Bias Estimating Method

The two-dimensional plane of the X axis and the Z axis is considered above, but a three-dimensional space including the Y axis can be considered similarly. In consideration of the three-dimensional space, the detection values of the detection axes are expressed by Expression (1), in consideration of components in the detection axis directions of the gravitational acceleration and the bias values of the detection axes.

$$\begin{pmatrix} f_x \\ f_y \\ f_z \end{pmatrix} = \begin{pmatrix} \cos\theta\cos\psi & \cos\theta\sin\psi & -\sin\theta \\ -\cos\phi\sin\psi + \sin\phi\sin\theta\cos\psi & \cos\psi + \sin\phi\sin\theta\sin\psi & \sin\phi\cos\theta \\ \sin\phi\sin\psi + \cos\phi\sin\theta\cos\psi & -\sin\phi\cos\psi + \cos\phi\sin\theta\sin\psi & \cos\phi\cos\theta \end{pmatrix} \begin{pmatrix} 0 \\ 0 \\ -g \end{pmatrix} + \begin{pmatrix} b_{ax} \\ b_{ay} \\ b_{az} \end{pmatrix} \quad (1)$$

Expression (1) is a matrix expression, but can be changed to an expression not using a matrix as expressed by Expression (2).

$$f_x = g\sin\theta + b_{ax}$$
$$f_y = -g\sin\phi\cos\theta + b_{ay}$$
$$f_z = -g\cos\phi\cos\theta + b_{az} \quad (2)$$

As can be seen from Expression (2), the detection values "$f=(f_x, f_y, f_z)$" of the acceleration sensor contain two types of components of detection-axis components of the gravitational acceleration and the bias component. It is not easy to separate the two types of components from the detection value of the acceleration sensor. That is, it is difficult to specify by what ratios the detection value contains the two types of components. Therefore, in this embodiment, the bias value contained in the detection value of the acceleration sensor is estimated using the posture angle calculated with a bias which is assumed to be zero.

Parameters will be defined for the below explanation. The posture of the acceleration sensor determined by the roll angle and the pitch angle "$(\phi, \theta)$" of Expression (2) is defined as an "actual posture" and the posture angle thereof is defined as an "actual posture angle". The bias value "$b_a=(b_{ax}, b_{ay}, b_{az})$" of the detection axes given by Expression (2) is defined as an "actual bias value".

Assumed that the biases of the detection axes are zero, "$b_a=(b_{ax}, b_{ay}, b_{az})=(0, 0, 0)$" is established. In this case, a virtual posture angle "$(\phi, \theta)$" can be calculated using the detection values "$(f_x, f_y, f_z)$" of the detection axes of the acceleration sensor. The posture angle with a bias which is assumed to be zero is defined as a "virtual posture angle" and the posture of the acceleration sensor determined by the virtual posture angle is defined as a "virtual posture". To distinguish the virtual posture angle from the actual posture angle, the superscript 't' is added to the virtual posture angle and is expressed as "$(\phi^t, \theta^t)$". The virtual posture angle "$(\phi^t, \theta^t)$" is calculated by Expression (3).

$$\phi^t = \arctan2(-f_y, -f_z)$$
$$\theta^t = \arctan\frac{f_x}{\sqrt{f_y^2 + f_z^2}} \quad (3)$$

The bias value can be calculated backward from Expression (2) by using the virtual posture angle "$(\phi^t, \theta^t)$". The bias value calculated using the virtual posture angle is defined as a "virtual bias value" and a superscript "t" is added to the virtual bias value to distinguish the virtual bias value from the actual bias value. Specifically, the virtual bias values of the X axis, the Y axis, and the Z axis are expressed by "$b^t_a=(b^t_{ax}, b^t_{ay}, b^t_{az})$".

The difference between the virtual posture angle and the actual posture angle is referred to as a "posture angle error" and is expressed by adding "$\delta$ (delta)" to the front of the posture angle. Specifically, the posture angle error is expressed by "$(\delta\phi=\phi^t-\phi, \delta\theta=\theta^t-\theta)$". "$\delta\phi$" represents a roll angle error and "$\delta\theta$" represents a pitch angle error. The difference between the virtual bias value and the actual bias value is referred to as a "bias error" and is expressed by adding "$\delta$" to the front of the bias value. Specifically, the bias errors of the X axis, the Y axis, and the Z axis are expressed by "$\delta b_a=(\delta b_{ax}, \delta b_{ay}, \delta b_{az})=(b^t_{ax}-b_{ax}, b^t_{ay}-b_{ay}, b^t_{az}-b_{az})$".

Figure 4:
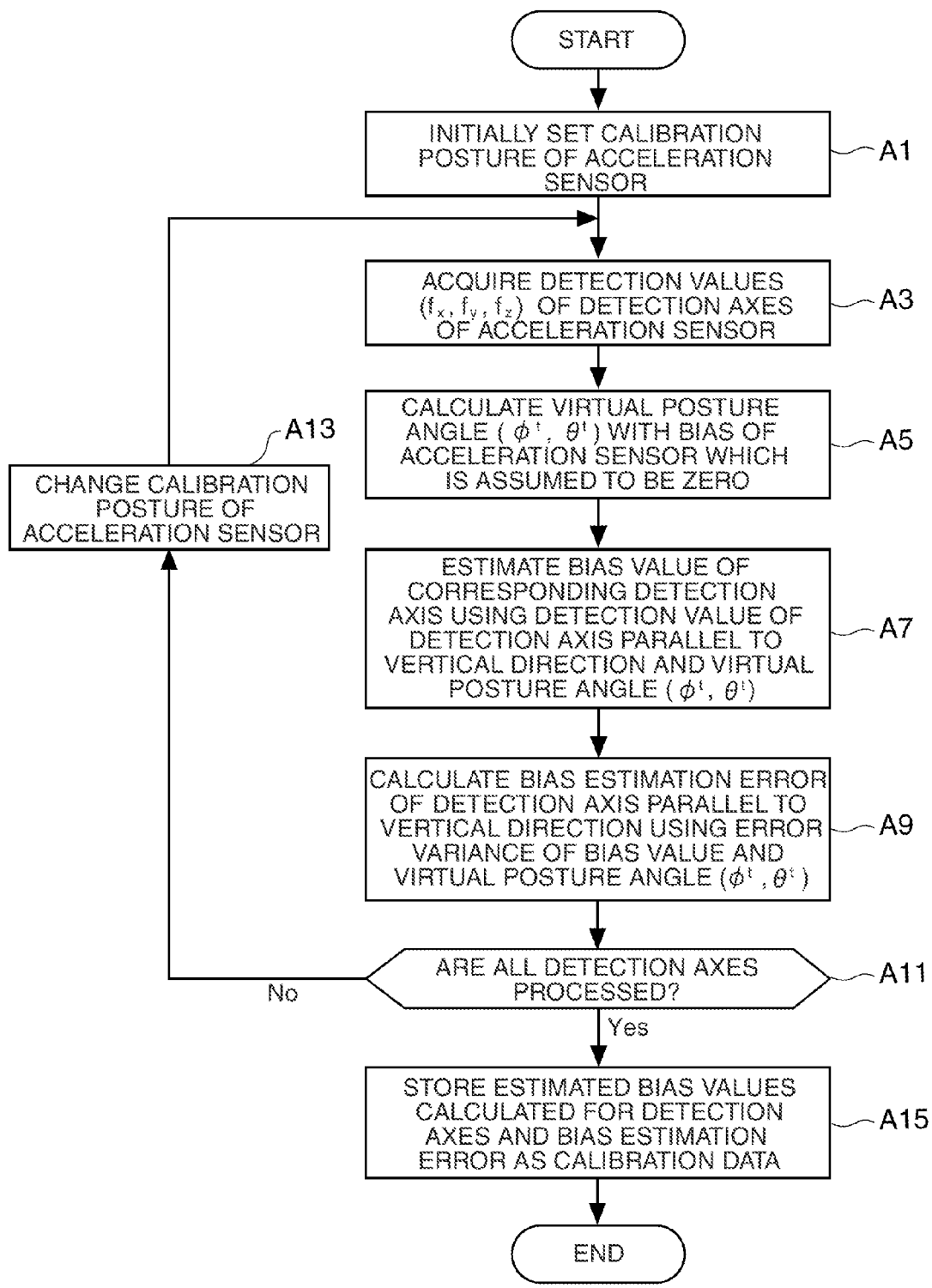
FIG. 4 is a flow diagram illustrating the flow of a bias estimating method.

FIG. 4 is a flow diagram illustrating the flow of a bias estimating method according to this embodiment.

First, a calibration posture of the acceleration sensor is initially set (step A1). Specifically, the acceleration sensor is installed in the substantially-horizontal installation base with a calibration posture where one axis of three detection axes is parallel to the vertical direction.

Here, the detection values "$f=(f_x, f_y, f_z)$" of the detection axes of the acceleration sensor are acquired (step A3). Assumed that the bias values of the detection axes of the acceleration sensor are zero, the virtual posture angle "$(\phi^t, \theta^t)$" is calculated by the use of Expression (3) (step A5).

Subsequently, the bias value of the corresponding detection axis is estimated using the detection value of the detection axis parallel to the vertical direction among the detection values acquired in step A3 and the virtual posture angle "$(\phi^t, \theta^t)$" calculated in step A5 (step A7). The estimated value of the bias value is referred to as an "estimated bias value". For example, it is assumed that the acceleration sensor is installed with the calibration posture where the Z axis is parallel to the vertical direction in step A1. In this case, the virtual bias value "$b^t_{az}$" of the Z axis is calculated using the detection value "$f_z$" of the Z axis and the virtual posture angle "$(\phi^t, \theta^t)$" and using the lowest expression of Expression (2), and the calculated value is defined as the estimated bias value of the Z axis.

In this embodiment, the bias value of a detection axis parallel to the vertical direction is estimated using the virtual posture angle "$(\phi^t, \theta^t)$". The reason of paying attention to the detection axis parallel to the vertical direction is as follows. Since the virtual posture angle "$(\phi^t, \theta^t)$" is a posture angle calculated by assuming the bias as zero, the virtual posture angle contains a posture angel error "$(\delta\phi, \delta\theta)$". Accordingly, the bias value (the virtual bias value) calculated using the virtual posture angle "$(\phi^t, \theta^t)$" contains an error. In this way, since the posture angle error "$(\delta\phi, \delta\theta)$" has an influence on the bias value, the inventor thought it as appropriate that the detection axis for which the influence of the posture angle error "$(\delta\phi, \delta\theta)$" on the bias value is the smallest is selected to estimate the bias value.

Here, Expression (2) represents the detection values "$(f_x, f_y, f_z)$" of the detection axes when the Z axis is parallel to the vertical direction. The gravitational acceleration components of the detection values "$(f_x, f_y)$" of the X axis and the Y axis contain a sine "sin", but the detection value "$f_z$" of the Z axis does not contain "sin". The gravitational acceleration component of the detection value "$f_z$" of the Z axis contains only a cosine "cos". The inventor paid attention to this point.

For the purpose of easy understanding, the pitch angle "$\theta$" is considered. When the cosine of the pitch angle "$\theta$" is Taylor-expanded with respect to the pitch angle error "$\delta\theta$" and the terms up to the first-order term are left, "$\cos(\theta+\delta\theta) \approx \cos\theta - \sin\theta \cdot \delta\theta$" is obtained. When the pitch angle "$\theta$" is small, the second term in the right side can be considered as zero and thus it can approximate to "$\cos(\theta+\delta\theta) \approx \cos\theta$". The same is true of the roll angle "$\phi$". That is, when the roll angle "$\phi$" is small, it can approximate to "$\cos(\phi+\delta\phi) \approx \cos\phi$".

On the other hand, when the sine of the pitch angle "$\theta$" is Taylor-expanded with respect to the pitch angle error "$\delta\theta$", "$\sin(\theta+\delta\theta) \approx \sin\theta + \cos\theta \cdot \delta\theta$" is obtained. When the pitch angle "$\theta$" is small, it can approximate to "$\sin(\theta+\delta\theta) \approx \sin\theta+\delta\theta$" ($\cos\theta \approx 1$) but the pitch angle error "$\delta\theta$" cannot be ignored. The same is true of the sine of the roll angle "$\phi$".

Accordingly, since the posture angle error "$(\delta\phi, \delta\theta)$" hardly has an influence on the gravitational acceleration of the detection axis parallel to the vertical direction, the influence of the posture angel error "$(\delta\phi, \delta\theta)$" on the bias value of the detection axis parallel to the vertical direction can be substantially ignored. That is, the detection axis in which the influence of the posture angle error "$(\delta\phi, \delta\theta)$" on the bias value is the smallest is the detection axis parallel to the vertical direction. Accordingly, the inventor selected the detection axis parallel to the vertical direction to estimate the bias value.

Referring to the flow diagram shown in FIG. 4 again, when the bias value of the detection axis parallel to the vertical axis is estimated, the error contained in the estimated bias value is estimated using the error variance "$\sigma$" of the bias value and the virtual posture angle "$(\phi^t, \theta^t)$" (step A9). The estimated bias value obtained in step A7 is a virtual bias value containing an error. Accordingly, by calculating the bias estimation error contained in the estimated bias value, the reliability of the estimated bias value is determined. The method of calculating the bias estimation error will be described later in detail.

Thereafter, it is determined whether the processes of steps A3 to A9 should be performed on all the detection axes of the acceleration sensor (step A11). When a non-processed detection axis exists (NO in step A11), the calibration posture of the acceleration sensor is changed (step A13). Specifically, the acceleration sensor is installed on the installation base with the calibration posture where the non-processed detection axis is parallel to the vertical direction. Then, in step A3, the bias estimation and the bias estimation error calculation are performed again on the non-processed detection axis.

On the other hand, when it is determined in step A11 that the processes have been processed on all the detection axes (YES in step A11), the estimated bias value "$b^t_a=(b^t_{ax}, b^t_{ay}, b^t_{az})$" and the bias estimation error "$\delta b_a=(\delta b_{ax}, \delta b_{ay}, \delta b_{az})$" of the respective detection axes are stored as calibration data of the acceleration sensor (step A15). Then, the bias value estimating process is ended.

The bias estimation error can be calculated using the error variance "$\sigma$" of the bias values and the virtual posture angle "$(\phi^t, \theta^t)$". The error variance "$\sigma$" of the bias values means the extension of error of the bias value of the acceleration sensor. In this embodiment, since the acceleration sensor is at least a temperature-compensated sensor, the bias value contained in the detection value is a value in which the error due to the temperature-dependent component is reduced. However, the bias values of all the acceleration sensors are not uniform due to variations between products.

The variations between products can be measured, for example, by performing an experiment using a tester at the time of manufacturing the acceleration sensors. That is, by performing the temperature compensation on the respective acceleration sensor products and then measuring the bias values remaining in the detection values of the acceleration sensors, an error distribution of the bias values is obtained. The extension of error of the bias values is calculated as the error variance from the error distribution of the bias values. The error distribution can be calculated, for example, as a standard deviation or variance value of the bias values.

In recent years, an MEMS sensor as a small and inexpensive inertial sensor employing the fine processing technology of semiconductor has been mounted on various consumer products. For example, in the MEMS sensor, the bias value of the temperature-compensated acceleration sensor is a value of "mg (where g is the gravitational acceleration)=0.001·g" order. In this embodiment, the MEMS acceleration sensor is assumed and the error variance of the bias value is expressed by "$\sigma mg=0.001 \cdot \sigma \cdot g$".

1-2. Method of Calculating Bias Estimation Error

The bias estimation error of the detection axis parallel to the vertical direction can be calculated and estimated from the magnitude of the posture angle error "$(\delta\phi=\phi^t-\phi, \delta\theta=\theta^t-\theta)$". Here, it is exemplified that the acceleration sensor is installed with the calibration posture where the Z axis is parallel to the vertical direction. That is, the bias estimation error "$\delta b_{az}$" contained in the estimated bias value "$b^t_{az}$" of the Z axis is calculated.

When it is assumed that the bias value is equal to or less than the error variance, "$b_a=(b_{ax}, b_{ay}, b_{az}) \leq 0.001 \cdot \sigma \cdot g$" is established. In this case, Expression (4) can be obtained from the expression regarding the detection value "$f_{ax}$" of the X axis in the uppermost end of Expression (2).

$$f_x - g \sin \theta = b_{ax}$$

$$|g(\sin \theta^r - \sin \theta)| = |b_{ax}| \leq 0.001 \sigma \cdot g$$

$$|\sin \theta^r - \sin \theta| \leq 0.001\sigma \quad (4)$$

Here, "$f_x = g \cdot \sin \theta^r$" of Expression (2) is used in the change from the first row to the second row.

Here, since the virtual pitch angle "$\theta^r$" can be expressed as "$\theta^r = \theta + \delta\theta$" using the pitch angle error "$\delta\theta$", Expression (4) can be changed to Expression (5).

$$|\sin(\theta+\delta\theta) - \sin \theta| \leq 0.001\sigma$$

$$|\sin \theta \cos \delta\theta + \cos \theta \sin \delta\theta - \sin \theta| \leq 0.001\sigma$$

$$|\sin \theta + \cos \theta \sin \delta\theta - \sin \theta| \leq 0.001\sigma$$

$$|\cos \theta \sin \delta\theta| \leq 0.001\sigma \quad (5)$$

Here, since "$\delta\theta$" is sufficiently small ($\delta\theta \ll 1$), the approximation of "$\cos \delta\theta \approx 1$" is used in the change from the second row to the third row.

In this embodiment, since the installation base is substantially horizontal, it can be thought that the pitch angle "$\theta$" is very small. Therefore, using the approximation of "$\cos \theta \approx 1$", Expression (6) is obtained.

$$|\sin \delta\theta| \leq 0.001\sigma$$

$$|\delta\theta| \leq \arcsin(0.001\sigma) \quad (6)$$

Accordingly, it can be seen that the pitch angle error "$\delta\theta$" has the maximum value of "$\arcsin(0.001\sigma)$" and the minimum value of "0".

Then, the bias estimation error "$\delta b_{az}$" of the Z axis is calculated using the inequality of Expression (6). From the expression regarding the detection value "$f_z$" of the Z axis in the lowest row of Expression (2), the bias value "$b_{az}$" of the Z axis can be calculated by Expression (7).

$$\begin{aligned} b_{az} &= f_z + g \cos\phi \cos\theta \quad (7) \\ &= f_z + g \cos(\phi^r - \delta\phi)\cos(\theta^r - \delta\theta) \\ &= f_z + g(\cos\phi^r \cos\delta\phi + \sin\phi^r \sin\delta\phi)(\cos\theta^r \cos\delta\theta + \sin\theta^r \sin\delta\theta) \end{aligned}$$

Here, "$\phi = \phi^r - \delta\phi$" and "$\theta = \theta^r - \delta\theta$" are established.

Here, when it is assumed that the roll angle error "$\delta\phi$" and the pitch angle error "$\delta\theta$" are sufficiently small ($\delta\phi, \delta\theta \ll 1$) and "$\delta\phi \approx \delta\theta$" and "$\cos \delta\theta \approx 1$" are approximated, Expression (8) is obtained from Expression (7).

$$\begin{aligned} b_{az} &\approx f_z + g(\cos\phi^r + \sin\phi^r \sin\delta\theta)(\cos\theta^r + \sin\theta^r \sin\delta\theta) = \quad (8) \\ &f_z + g(\cos\phi^r \cos\theta^r + \cos\phi^r \sin\theta^r \sin\delta\theta + \\ &\sin\phi^r \sin\delta\theta \cos\theta^r + \sin\phi^r \sin\theta^r \sin^2\delta\theta) \approx \\ &f_z + g(\cos\phi^r \cos\theta^r + \cos\phi^r \sin\theta^r \sin\delta\theta + \sin\phi^r \sin\delta\theta \cos\theta^r) = \\ &f_z + g\cos\phi^r \cos\theta^r + g\sin\delta\theta \sin(\phi^r + \theta^r) \end{aligned}$$

Here, the approximation of "$\sin^2 \delta\theta \approx 0$" is used in the change from the second row to the third row.

Since "$f_z + g \cdot \cos \theta^r \cdot \cos \theta^r = b^t_{az}$" is established from Expression (2), Expression (9) can be obtained from Expression (8).

$$b_{az} = b^t_{az} + g \sin \delta\theta \sin(\phi^r + \theta^r)$$

$$b_{az} - b^t_{az} = g \sin \delta\theta \sin(\phi^r + \theta^r)$$

$$|\delta b_{az}| = g \sin \delta\theta \sin(\phi^r + \theta^r) \quad (9)$$

Here, "$\delta b_{az} = b^t_{az} - b_{az}$" is established.

Here, Expression (10) can be finally obtained from Expression (9) by using the inequality of Expression (6).

$$|\delta b_{az}| \leq 0.001\sigma \cdot g \cdot \sin(\phi^r + \theta^r) \quad (10)$$

Accordingly, the bias estimation error $|\delta b_{az}|$ of the Z axis has the maximum value of "$0.001 \cdot \sigma \cdot g$" and the minimum value of "0".

Figure 5:
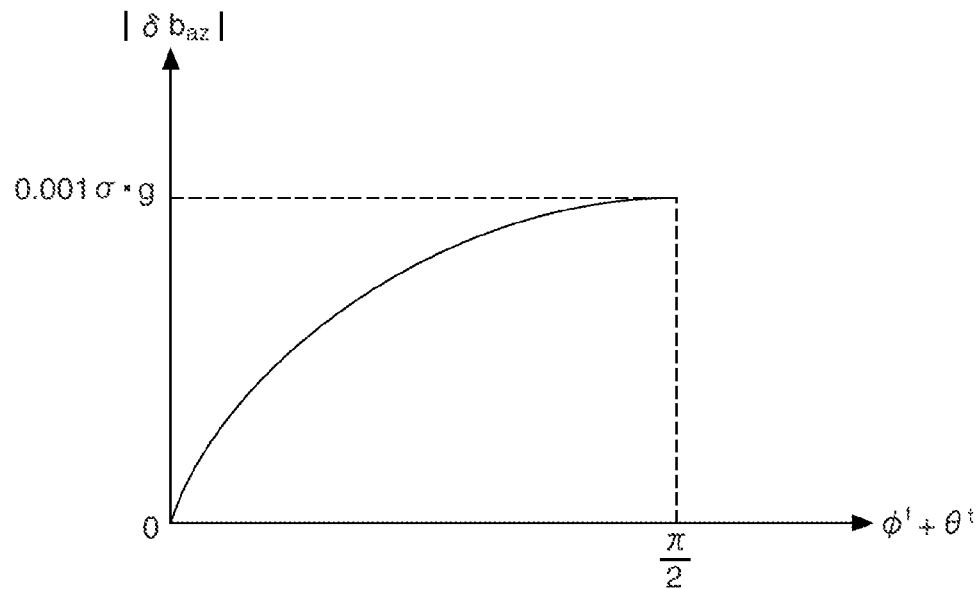
FIG. 5 is a graph illustrating the correspondence between a posture angle and a bias estimation error.

FIG. 5 is a graph illustrating the inequality of Expression (10). In FIG. 5, the horizontal axis represents "$\phi^r + \theta^r$" and the vertical axis represents the bias estimation error $|\delta b_{az}|$ of the Z axis. It can be seen from Expression (10) that the bias estimation error $|\delta b_{az}|$ of the Z axis depends on the magnitude of the virtual posture angle "$(\phi^r, \theta^r)$".

Figure 6:
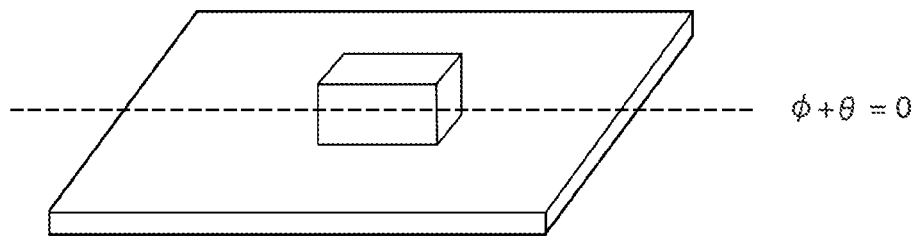
FIG. 6 is a diagram illustrating the determination of inclination of the installation surface.

As shown in FIG. 6, when the installation base is completely horizontal, "$\phi^r + \theta^r = 0$" is established and thus the bias estimation error $|\delta b_{az}|$ of the Z axis is zero. If the bias estimation error $|\delta b_{az}|$ is zero, it means that the estimated bias value "$b^t_{az}$" of the Z axis is equal to the actual bias value "$b_{az}$" ($b^t_{az} = b_{az}$).

Figure 7:
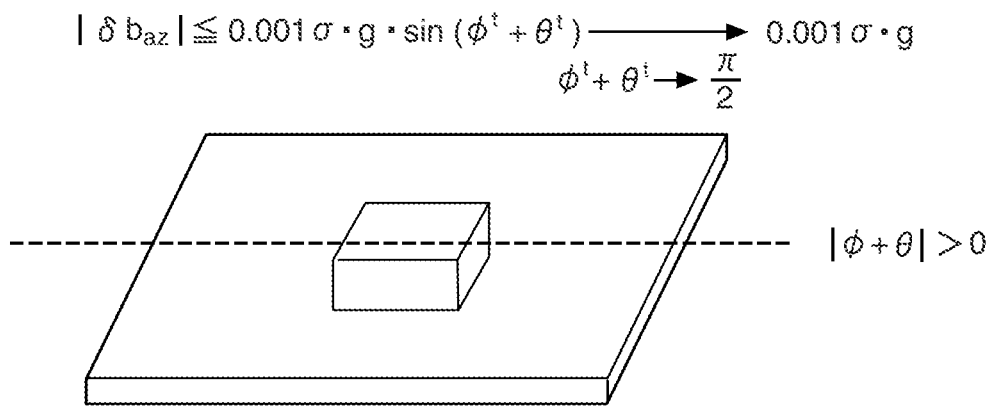
FIG. 7 is a diagram illustrating the determination of inclination of the installation surface.

On the contrary, as shown in FIG. 7, when the installation base is inclined, "$|\phi^r + \theta^r| > 0$" is established and thus the bias estimation error $|\delta b_{az}|$ of the Z axis gets closer to "$0.001 \cdot \sigma \cdot g$" as the inclination becomes greater. This means that the error contained in the estimated bias value "$b^t_{az}$" of the Z axis is great and the estimated bias value "$b^t_{az}$" is greatly separated from the actual bias value "$b_{az}$".

In other words, the inclination of the installation base on which the acceleration sensor is installed may be determined from the magnitude of the bias estimation error of the detection axis parallel to the vertical direction. That is, it can be determined that the installation base is close to horizontal when the bias estimation error is small but the inclination of the installation base is great when the bias estimation error is great. Namely, it can be said that the bias estimation error is an index value for determining the inclination of the installation base.

Hitherto, it has been described that the acceleration sensor is installed with the calibration posture where the Z axis of the acceleration sensor is parallel to the vertical direction, and the same is true of the remaining detection axes. That is, by installing the acceleration sensor in the installation base with the calibration posture where each of the X axis and the Y axis is parallel to the vertical direction and performing the same calculations, it is possible to calculate the estimated bias values "$(b_{az}, b_{ay})$" of the X axis and the Y axis and the estimation errors "$(\delta b_{ax}, \delta_{ay})$" thereof.

1-3. Posture Estimating Method

When the bias values of the detection axes of the acceleration sensor can be estimated, the posture of the acceleration sensor can be estimated. Accordingly, the posture estimating method of the acceleration sensor will be described below.

First, the detection values of the detection axes of the acceleration sensor are corrected using the estimated bias values of the detection axes. The posture angle "$(\phi, \theta)$" of the acceleration sensor is estimated by Expression (11) using the corrected detection values (corrected detection values).

$$\phi = \arctan2(-(f_y - b_{ay}), -(f_z - b_{az})) \quad (11)$$

$$\theta = \arctan \frac{f_x - b_{ax}}{\sqrt{(f_y - b_{ay})^2 + (f_z - b_{az})^2}}$$

Here, "$f_x-b_{ax}$", "$f_y-b_{ay}$", and "$f_z-b_{az}$" are the corrected detection values of the detection axes of the acceleration sensor.

When the bias estimation error of each detection axis is small, it can be said that the estimated bias value of the corresponding detection axis is close to the actual bias value. Accordingly, when the detection values of the acceleration sensor are corrected using the estimated bias values, it is possible to calculate an accurate acceleration. In this case, since the posture angle "$(\phi, \theta)$" of the acceleration sensor can be correctly calculated by Expression (11), it is possible to accurately estimate the current posture of the acceleration sensor.

2. Examples

Examples of a bias estimating device estimating a bias value of an acceleration sensor and a posture estimating device estimating a posture of the acceleration sensor in accordance with the above-mentioned principle will be described below. Herein, a car navigation apparatus is exemplified as an electronic apparatus including the bias estimating device and the posture estimating device.

2-1. System Configuration

Figure 8:
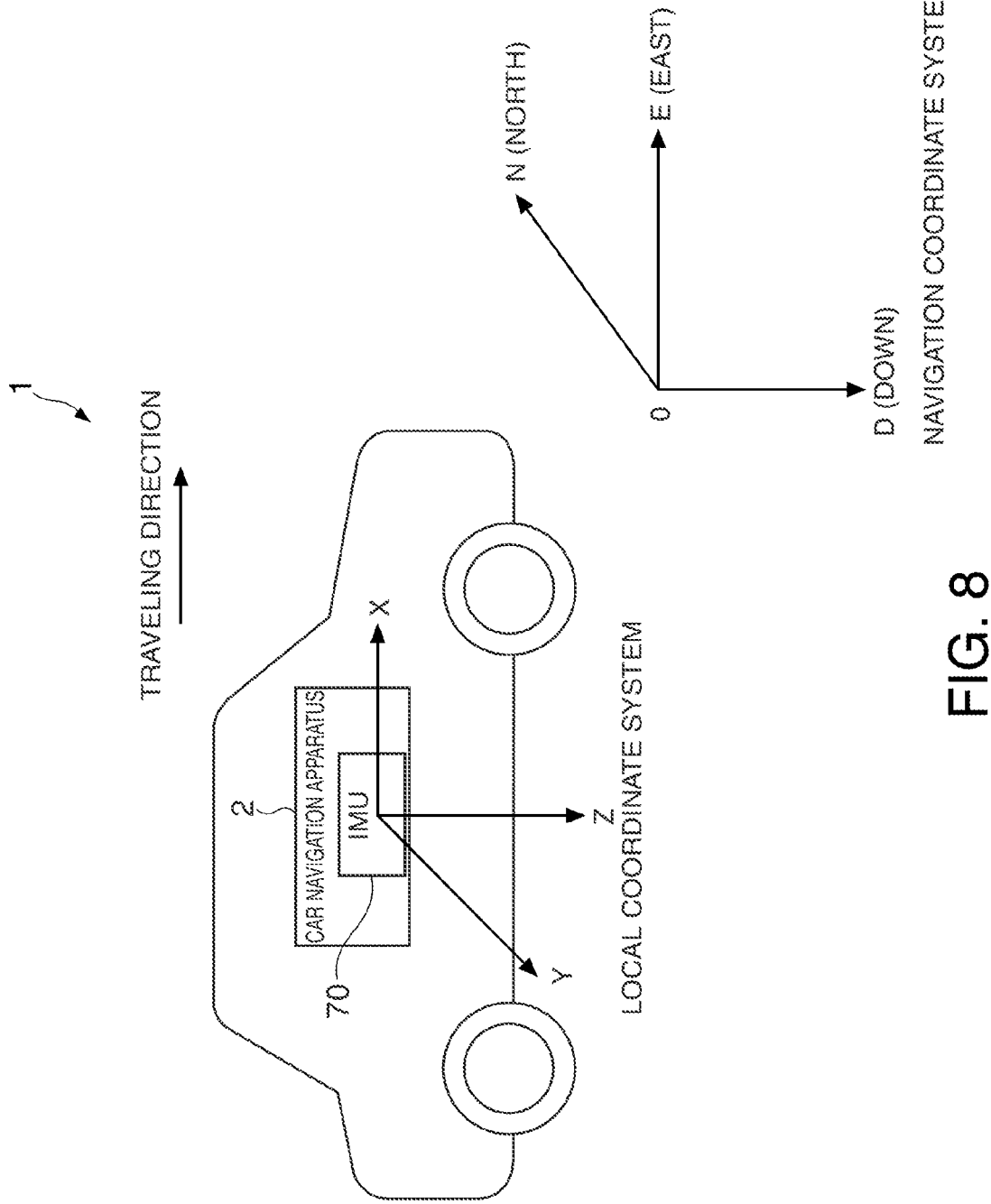
FIG. 8 is a diagram illustrating the system configuration of a navigation system.

FIG. 8 is a diagram illustrating the system configuration of a navigation system 1 according to an example of the invention. The navigation system 1 includes a car navigation apparatus 2 mounted on a four-wheeled vehicle (hereinafter, simply referred to as a "vehicle") which is a kind of moving object.

The car navigation apparatus 2 is an electronic apparatus mounted on a vehicle and includes an IMU (Inertial Measurement Unit) 70 which is a sensor unit including an acceleration sensor 71 and a gyro sensor 73. The IMU 70 detects and outputs an acceleration and an angular speed in a local coordinate system correlated with the detection axes of the sensors. The car navigation apparatus 2 includes a bias estimating device estimating a bias value of the acceleration sensor 71 in accordance with the above-mentioned principle and a posture estimating device estimating the posture of the acceleration sensor 71, that is, the posture of the apparatus body.

The car navigation apparatus 2 converts the acceleration in the local coordinate system detected by the acceleration sensor 71 into an acceleration in a navigation coordinate system which is a coordinate system for performing the navigation. For example, an NED coordinate system which is known as a north-east-down coordinate system can be used as the navigation coordinate system. A velocity vector of the vehicle is calculated by integrating the acceleration in the NED coordinate system and the position of the vehicle is calculated through the use of inertial navigation calculation using the velocity vector. A navigation picture in which the calculated position is plotted is generated and is displayed on a display (display unit) of the apparatus body.

2-2. Functional Configuration

Figure 9:
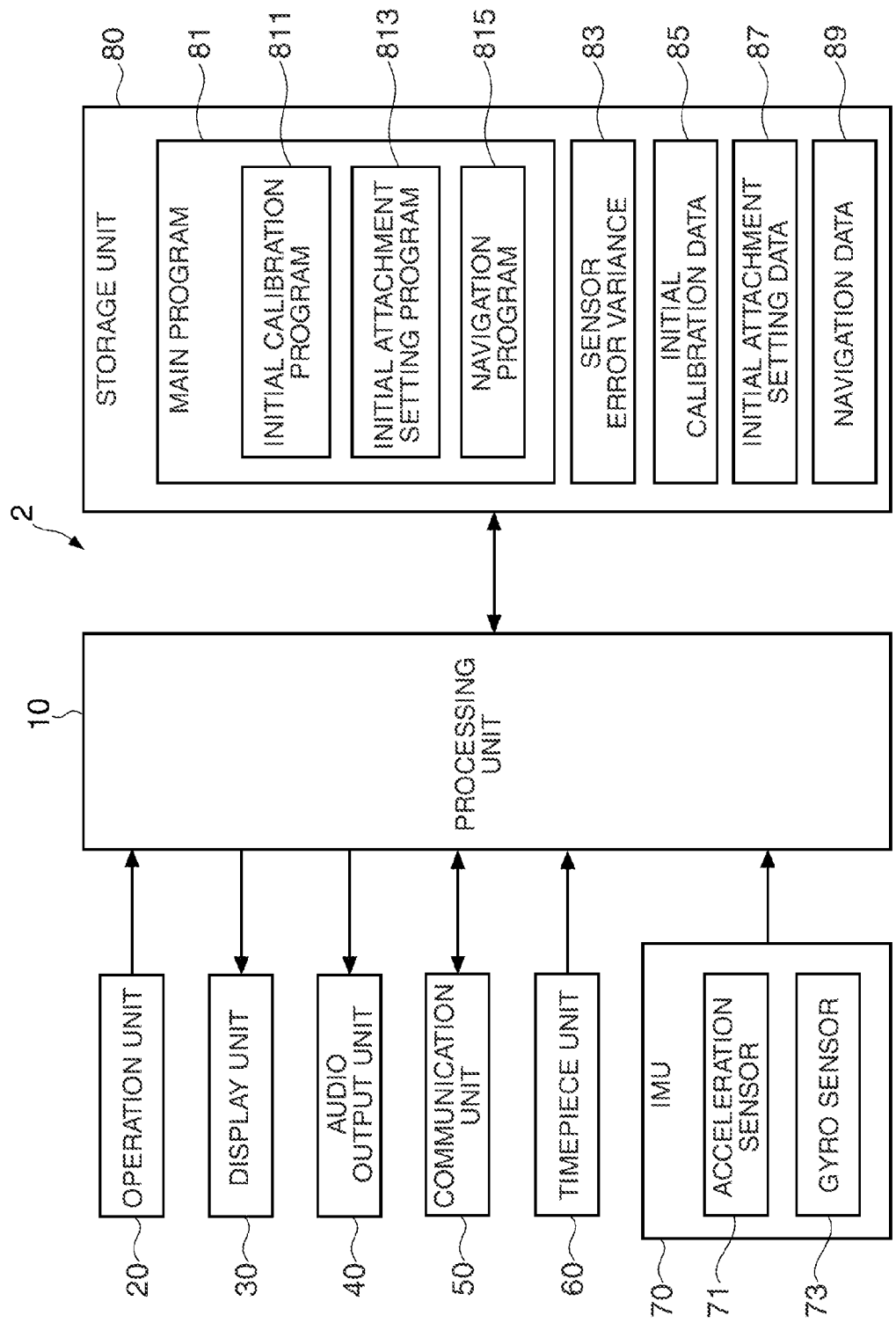
FIG. 9 is a block diagram illustrating the functional configuration of a navigation apparatus.

FIG. 9 is a block diagram illustrating the functional configuration of the car navigation apparatus 2. The car navigation apparatus 2 includes, a processing unit 10, an operation unit 20, a display unit 30, an audio output unit 40, a communication unit 50, a timepiece unit 60, an IMU unit 70, and a storage unit 80.

The processing unit 10 is a controller comprehensively controlling the units of the car navigation apparatus 2 in accordance with various programs such as a system program stored in the storage unit 80 and includes a processor such as a CPU (Central Processing Unit). The processing unit 10 performs an inertial navigation calculating process using the detection results of the IMU 70 and calculates the position (position coordinates) of the vehicle. The processing unit 10 performs a process of displaying a map with the calculated position marked therein on the display unit 30.

In this embodiment, the processing unit 10 serves as a virtual posture angle calculating unit calculating a virtual posture angle and also serves as a bias estimating unit estimating the bias value contained in the detection value of the acceleration sensor using the detection value of the acceleration sensor 71 and the virtual posture angle. The processing unit 10 also serves as a posture estimating unit estimating the posture of the acceleration sensor 71, that is, the posture of the apparatus body, using the bias value estimated by the bias estimating unit and the detection values of the axes of the acceleration sensor 71.

The operation unit 20 is an input unit including, for example, a touch panel or buttons and outputs a signal of a pressed key or button to the processing unit 10. Various instruction inputs such as a destination input are performed by the operation of the operation unit 20.

The display unit 30 includes an LCD (Liquid Crystal Display) and is a display device performing various displays based on the display signals input from the processing unit 10. The navigation picture or the like is displayed on the display unit 30.

The audio output unit 40 includes a speaker and is an audio output unit outputting various audios based on audio output signals input from the processing unit 10. Audio guidance or the like is output from the audio output unit 40.

The communication unit 50 is a communication device wirelessly communicating with an external device such as a management server of the car navigation apparatus 2. This function is performed by the use of a known wireless communication technique such as Bluetooth (registered trademark).

The timepiece unit 60 is an internal timepiece of the car navigation apparatus 2 and includes an oscillation circuit having a quartz crystal oscillator. The counted time of the timepiece unit 60 is output to the processing unit 10 at any time.

The IMU 70 is a sensor unit including an inertial sensor and includes, for example, an acceleration sensor 71 and a gyro sensor 73. The IMU 70 is configured to detect the accelerations of the detection axes of three orthogonal axes in the local coordinate system correlated with the sensors in advance and the angular velocities of the axial rotations of the detection axes. The acceleration sensor 71 and the gyro sensor 73 may be individual sensors or may be a single-bodied sensor.

The storage unit 80 includes a storage device such as a ROM (Read Only Memory) or a flash ROM and a RAM (Random Access Memory) and stores the system program of the car navigation apparatus 2, various programs performing various functions such as a navigation function, and data. The storage unit 80 includes a work area temporarily storing processing data of various processes, processing results, and the like.

2-3. Data Structure

As shown in FIG. 9, the storage unit 80 stores as a program a main program 81 which is read and executed as a main procedure (see FIG. 12) by the processing unit 10. The main program 81 includes as sub routines an initial calibration program 811 executed as an initial calibration process (see FIG. 13), an initial attachment setting program 813 executed as an initial attachment setting process (see FIG. 14), and a navigation program 815 executed as a navigation process.

The main procedure is a procedure of performing the initial calibration process and the initial attachment setting process of the processing unit 10 and performing the bias estimation of the acceleration sensor 71 and the posture estimation of the apparatus body attached to the vehicle. The processing unit 10 calculates the velocity vector of the vehicle in the navigation coordinate system using the detection values (corrected detection values) of the acceleration sensor 71 corrected by the use of the estimated bias value and the estimated attachment posture of the apparatus body, and calculates the position of the vehicle using the calculated velocity vector. The main procedure, the initial calibration process, and the initial attachment setting process will be described later in detail with reference to the flow diagrams.

The storage unit 80 stores sensor error variance 83, initial calibration data 85, initial attachment setting data 87, and navigation data 89 as data.

The sensor error variance 83 is data including the error variances of the acceleration sensor 71 and the gyro sensor 73 of the IMU 70. The sensor error variance 83 corresponds to the error variance "$\sigma$" of the acceleration sensor described in the principle and is data stored in the storage unit 80 in advance.

The initial calibration data 85 is data for the initial calibration process and the data structure thereof is shown in FIG. 10. The initial calibration data 85 includes a bias estimation error 851. The bias estimation error 851 is used to determine the inclination of the installation base in the initial calibration process. In the initial calibration data 85, the vertical axis 853 which is a detection axis of the acceleration sensor 71 parallel to the vertical direction in the calibration posture, the acceleration detection value 855 of the detection axes detected by the acceleration sensor 71 in the calibration posture, and the virtual posture angle 857 and the estimated bias value 859 calculated in the calibration posture are correlated with each other.

The initial attachment setting data 87 is data for the initial attachment setting process and the data structure thereof is shown in FIG. 11. In the initial attachment setting data 87, the acceleration detection value 871, the corrected acceleration detection value 873, and the estimated attachment posture 875 are correlated with each other.

The navigation data 89 is data for the navigation process. The navigation data 89 includes a coordinate conversion matrix used to convert an acceleration in the local coordinate system into an acceleration in the navigation coordinate system. The navigation data includes the acceleration of the vehicle converted using the coordinate conversion matrix, the velocity vector of the vehicle acquired by integrating the acceleration, and the position of the vehicle calculated using the velocity vector.

2-4. Flow of Processes

Figure 12:
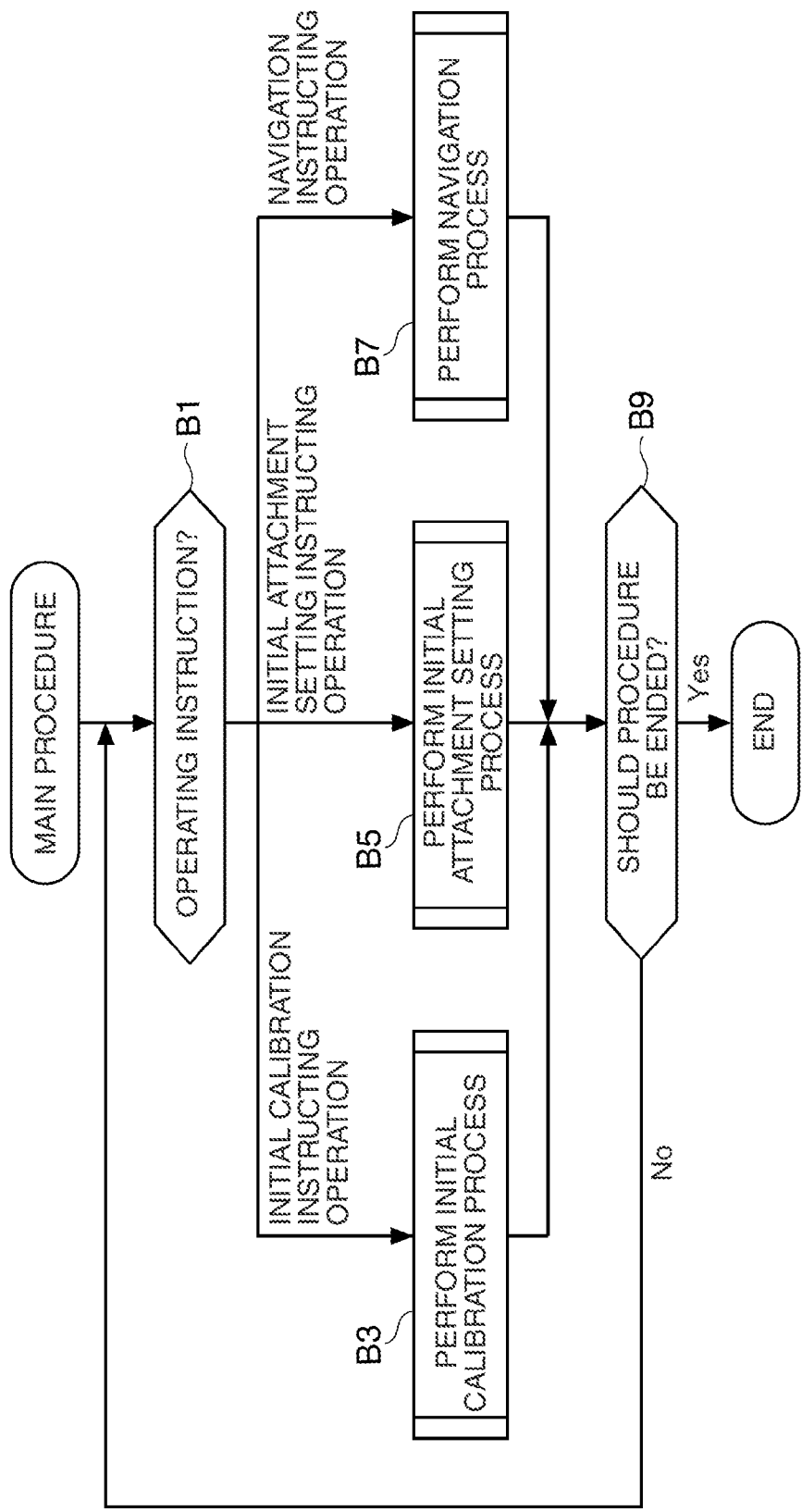
FIG. 12 is a flow diagram illustrating the flow of a main procedure.

FIG. 12 is a flow diagram illustrating the flow of the main procedure executed by the processing unit 10 in accordance with the main program 81 stored in the storage unit 80.

First, the processing unit 10 determines an instructing operation performed by a user through the operation unit 20 (step B1), and performs the initial calibration process in accordance with the initial calibration program 811 stored in the storage unit 80 (step B3) when it is determined that the instructing operation is an initial calibration instructing operation (Initial Calibration Instructing Operation in step B1).

Figure 13:
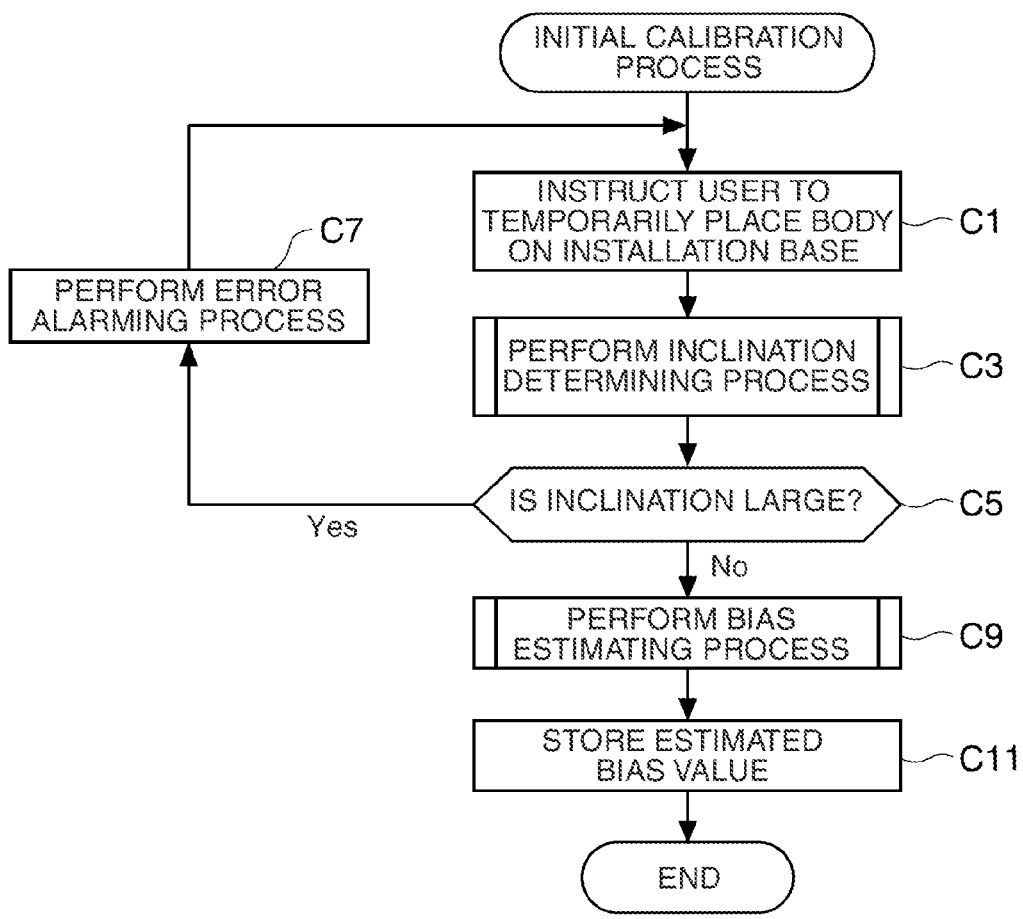
FIG. 13 is a flow diagram illustrating the flow of an initial calibration process.

FIG. 13 is a flow diagram illustrating the flow of the initial calibration process. The initial calibration process is a process of estimating the bias value of the acceleration sensor and is a process which should be performed before the car navigation apparatus 2 is installed in the vehicle 2.

First, the processing unit 10 instructs a user to temporarily attach the apparatus body to the installation base (step C1). Specifically, the user is instructed to temporarily attach the body of the car navigation apparatus 2 to a horizontal installation base. In instructing the user, for example, a display message representing a temporary attachment may be displayed on the display unit 30 or audio guidance instructing the temporary attachment may be output from the audio output unit 40. The user temporarily attaches the apparatus body to a horizontal table and initially calibrates the apparatus body, before the purchased car navigation apparatus 2 is installed in the vehicle.

In step C1, the apparatus body with a calibration posture where one axis of the acceleration sensor 71 is parallel to the vertical direction can be attached to the horizontal installation base. In order to notify the user of the installation direction of the apparatus body, for example, an arrow indicating the direction of the detection axis of the acceleration sensor 71 may be marked in the apparatus body. The method of installing the apparatus body and the installation posture may be drawn in a product manual.

Then, the processing unit 10 performs an inclination determining process of determining the inclination of the installation base (step C3). Specifically, by using the bias estimation error calculating method described in the principle, the processing unit 10 calculates the bias estimation error 851 of the detection axis parallel to the vertical direction and stores the calculated bias estimation error in the initial calibration data 85 of the storage unit 80. The processing unit 10 then compares the bias estimation error 851 with a predetermined threshold value and determines that the inclination of the installation base is greater when the bias estimation error 851 is greater than the predetermined threshold value.

When it is determined in the inclination determining process that the inclination of the installation base is greater (YES in step C5), the processing unit 10 performs an error alarming process (step C7). As described in the principle, when the installation base of the acceleration sensor 71 is inclined, the bias estimation error increases and the reliability of the estimated bias value thus decreases. Therefore, when the inclination of the installation base is great, an error is determined and the user is urged to install the apparatus body in another horizontal installation base, for example, through the use of a display message or audio guidance. Thereafter, the processing unit 10 performs again the process of step C1.

On the other hand, when it is determined in step C5 that the inclination of the installation base is small (NO in step C5), the processing unit 10 performs a bias estimating process (step C9). Specifically, by using the bias estimating method described in the principle, the bias values of the detection axes (the X axis, the Y axis, and the Z axis) of the acceleration sensor 71 are estimated. In this case, the apparatus body with the calibration posture where the corresponding detection axis is parallel to the vertical direction is installed in the installation base for each detection axis of the acceleration sensor 71. For the vertical axis 853 parallel to the vertical direction, the virtual posture angle 857 is calculated using the acceleration detection value 855 output from the acceleration sensor 71 and the estimated bias value 859 is calculated using the calculated virtual posture angle 857.

The processing unit 10 stores the estimated bias values 859 of the vertical axes 853 calculated in step C9 in the initial calibration data 85 of the storage unit 80 (step C11) and then ends the initial calibration process.

Referring to the main procedure shown in FIG. 12 again, when it is determined in step B1 that the instructing operation is the initial attachment setting instructing operation (Initial Attachment Setting Instructing Operation in step B1), the processing unit 10 performs the initial attachment setting process in accordance with the initial attachment setting program 813 of the storage unit 80 (step B5).

Figure 14:
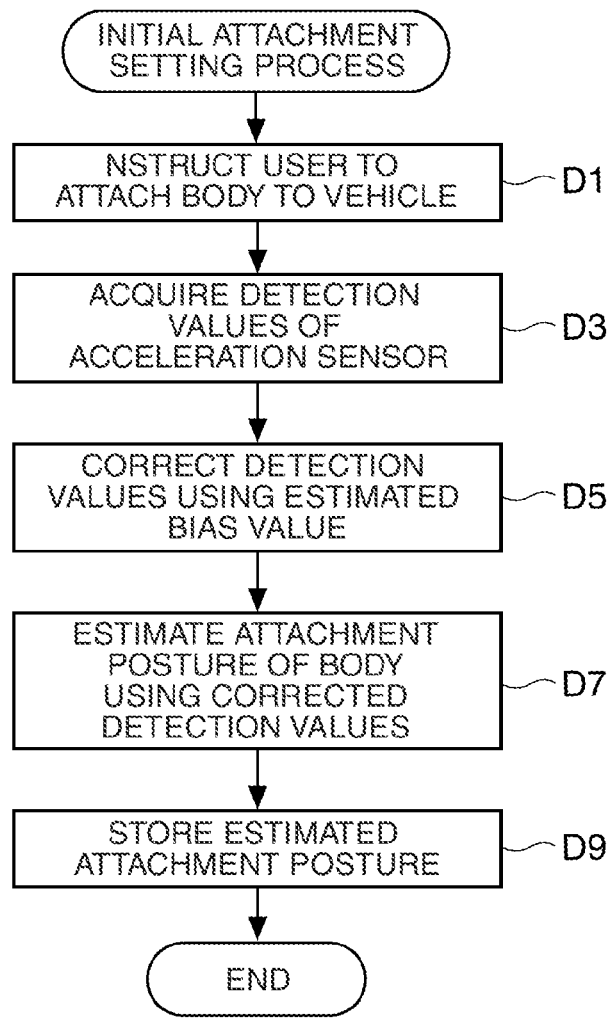
FIG. 14 is a flow diagram illustrating the flow of an initial attachment setting process.

FIG. 14 is a flow diagram illustrating the flow of the initial attachment setting process. The initial attachment setting process is a process of estimating the posture of the car navigation apparatus 2 attached to the vehicle and is a process that should be first performed after the car navigation apparatus 2 is attached to the vehicle. Even when the attachment position or the attachment posture is changed, the initial attachment setting process should be first performed after it is attached to a new place or with a new posture.

First, the processing unit 10 instructs the user to attach the body of the car navigation apparatus 2 to the vehicle (step D1). When the attachment to the vehicle is finished, the processing unit 10 acquires the acceleration detection values 871 of the detection axes of the acceleration sensor (step D3) and stores the acquired values in the initial attachment setting data 87 of the storage unit 80.

Subsequently, the processing unit 10 corrects the acceleration detection values 871 of the detection axes acquired in step D3 using the estimated bias values 859 of the vertical axes 853 stored in the initial calibration data 85 (step D5). That is, the processing unit 10 subtracts the estimated bias value 859 of the corresponding vertical axis 853 from the acceleration detection value 871 of each detection axis to calculate the corrected acceleration detection value 873. The corrected acceleration detection value 873 is stored in the initial attachment setting data 87 of the storage unit 80.

Thereafter, the processing unit 10 estimates the attachment posture "($\phi$, $\theta$)" of the apparatus body in accordance with Expression (11) using the corrected acceleration detection value 873 calculated in step D5 (step D7). The processing unit 10 stores the estimated attachment posture "($\phi$, $\theta$)" in the initial attachment setting data 87 of the storage unit 80 as the estimated attachment posture 875 (step D9) and ends the initial attachment setting process.

Referring to the main procedure of FIG. 12 again, when it is determined in step B1 that the instructing operation is the navigation instructing operation (Navigation Instructing Operation in step B1), the processing unit 10 performs the navigation process in accordance with the navigation program 815 stored in the storage unit 80 (step B7).

In the navigation process, the processing unit 10 performs a position calculating process using the inertial navigation calculation. Specifically, the processing unit 10 calculates the coordinate conversion matrix from the local coordinate system to the navigation coordinate system using the estimated attachment posture 875 stored in the initial attachment setting data 87. The method of calculating the coordinate conversion matrix is known and thus will not be described herein. The processing unit 10 converts the acceleration detection value of the acceleration sensor 71 of which the bias is corrected into the acceleration in the navigation coordinate system using the coordinate conversion matrix. Then, the processing unit 10 integrates the converted acceleration to calculate the velocity vector of the vehicle and adds the velocity vector to the previous (latest) position of the vehicle to calculate and update the position of the vehicle.

After performing one process of steps B3 to B7, the processing unit 10 determines whether the main procedure should be ended (step B9). Specifically, when the user instructs to turn on the power source of the apparatus body through the use of the operation unit 20, the processing unit 10 determines that the main procedure should be ended. When it is determined that the main procedure should not be ended yet (NO in step B9), the processing unit 10 performs the process of step B1 again. When it is determined that the main procedure should be ended (YES in step B9), the processing unit 10 ends the main procedure.

2-5. Experiment Result

The inventor performed an experiment for evaluating the performance of the bias estimation of the acceleration sensor and the detection value correction of the acceleration sensor. Specifically, a route experiment of the vehicle was performed using the inertial navigation described in the example and a GPS which is a kind of satellite positioning system and the velocity was calculated.

Figure 15:
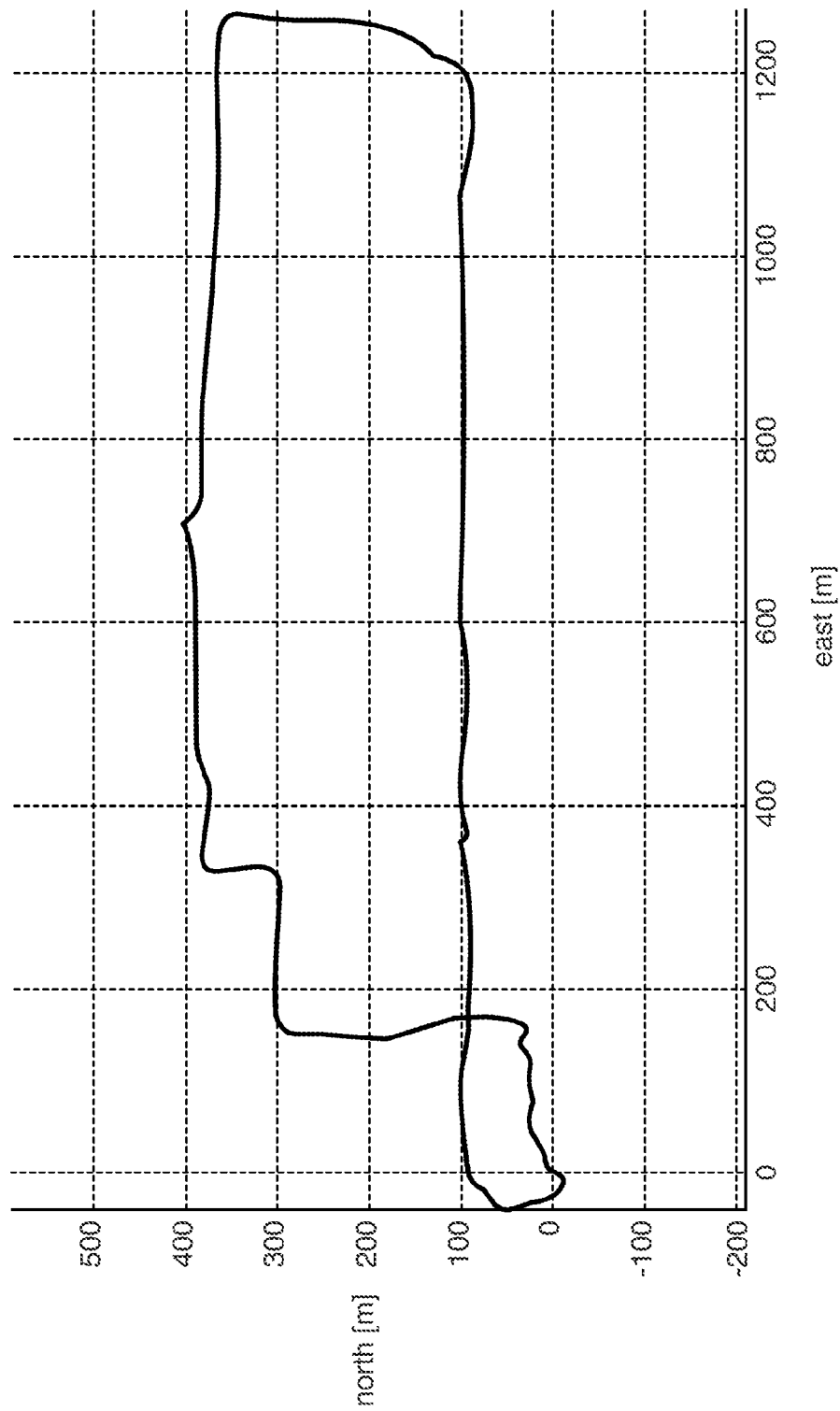
FIG. 15 is a diagram illustrating a route experiment.

FIG. 15 is a diagram illustrating a circulating trace of a vehicle. As shown in FIG. 15, the vehicle was made to travel along a predetermined circulating path. In FIG. 15, the horizontal axis represents the east-west direction and the vertical axis represents the north-south direction (of which the unit is meter). The position of "0 m" in the east-west direction and "0 m" in the north-south direction is a start point, the vehicle was made to travel along a path going by about 150 m to the east from the start point, then going to the north, and then circulating in the clockwise direction. The goal point is the same as the start point. The time taken for the circulation is "600 seconds" and the experiment was carried out on a plane hardly having a variation in altitude.

Figure 16A:
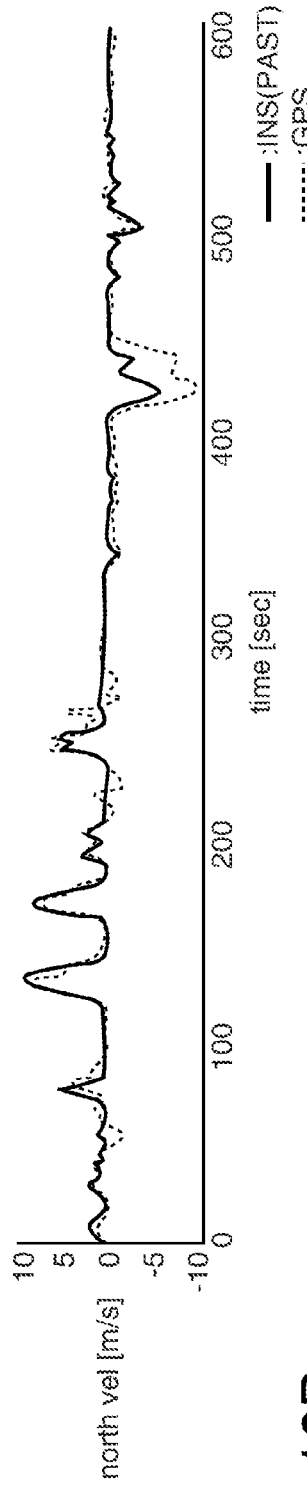
FIG. 16A is a diagram illustrating a temporal variation of a north-south component of a velocity.
Figure 16B:
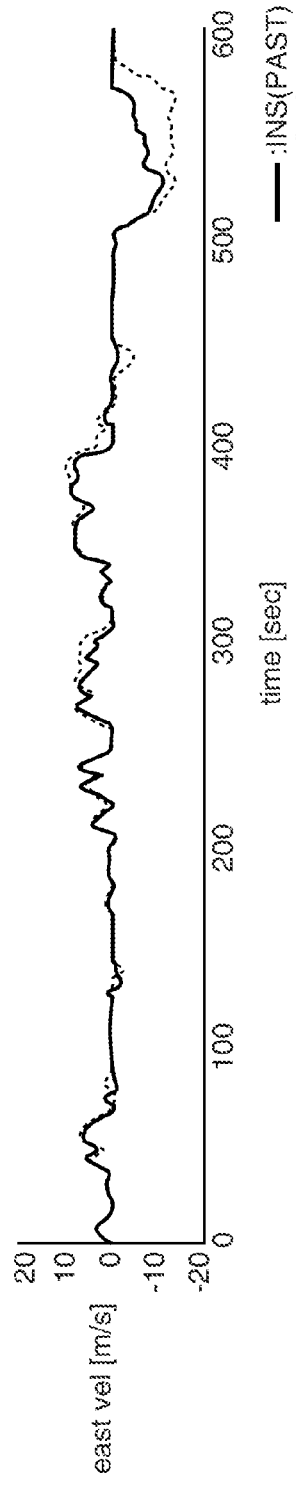
FIG. 16B is a temporal variation of an east-west component of the velocity.
Figure 16C:
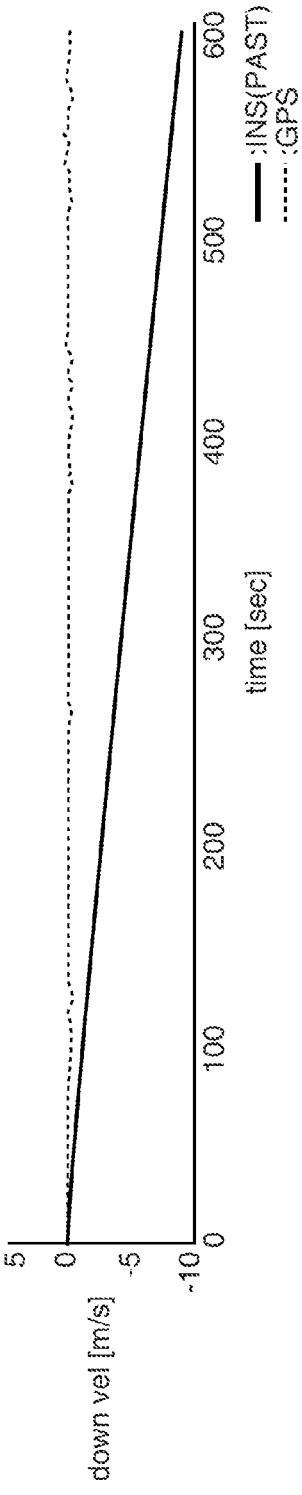
FIG. 16C is a temporal variation of an altitude component of the velocity.

FIGS. 16A to 16C are diagrams illustrating the velocity calculation results using the past method in which the Z-axis bias estimation and the bias correction are not carried out. FIGS. 16A to 16C show temporal variations of the components in the north-south direction, the east-west direction, and the altitude direction of the velocity vector, respectively. The velocity calculated using the GPS is marked by a dotted line (GPS) and the velocity calculated using the inertial navigation is marked by a solid line (INS).

Referring to the temporal variations of the velocity in the north-south direction and the east-west direction shown in FIGS. 16A and 16B, there is no great difference between the velocity calculated using the GPS and the velocity calculated using the inertial navigation. However, there is a great difference in the temporal variation of the velocity in the altitude direction shown in FIG. 16C. In this experiment, since the vehicle travels in a plane hardly having a variation in altitude, the calculated velocity should be "0 m/s". Referring to the velocity calculated using the GPS, it can be seen that the velocity is maintained almost at "0 m/s" even with the passage of time and thus a correct result is obtained.

Referring to the velocity calculated using the past inertial navigation, the velocity in the altitude direction slowly decreases from "0 m/s" with the passage of time and reaches "−10 m/s" at the time of 600 seconds. This is because the acceleration detected by the acceleration sensor is not subjected to the bias correction and thus the error based on the bias value is also integrated at the time of integrating the acceleration to calculate the velocity, thereby accumulating the error in the calculated velocity.

Figure 17A:
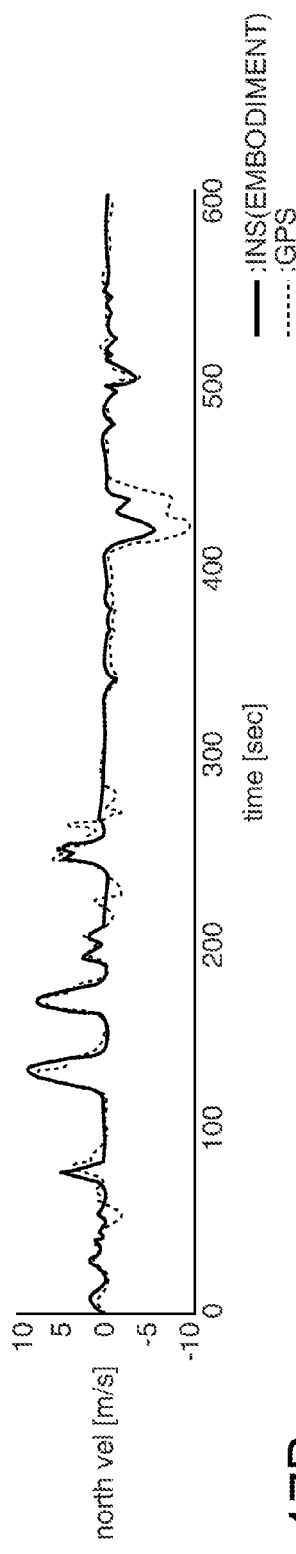
FIG. 17A is a diagram illustrating a temporal variation of a north-south component of a velocity.
Figure 17B:
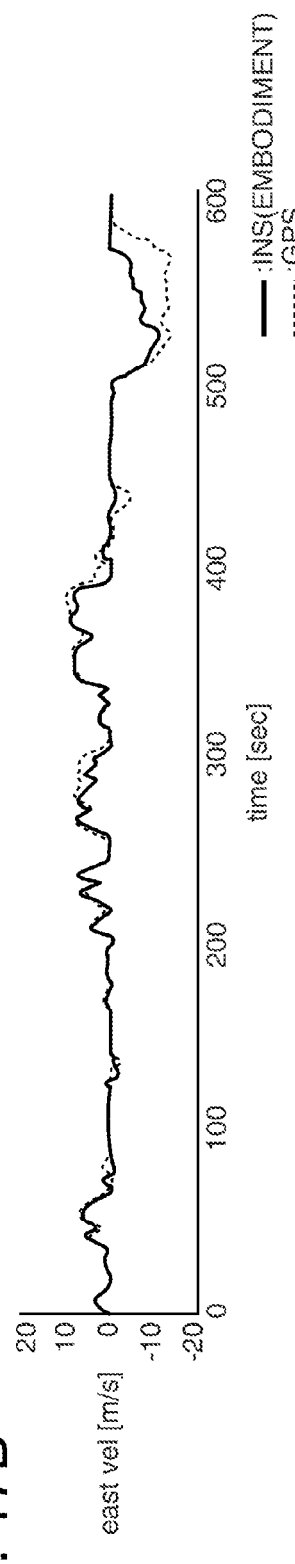
FIG. 17B is a temporal variation of an east-west component of the velocity.
Figure 17C:
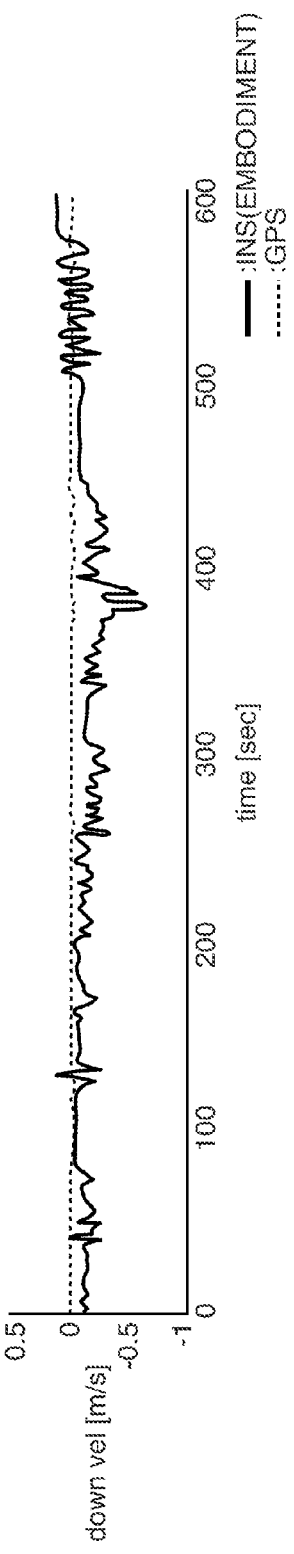
FIG. 17C is a temporal variation of an altitude component of the velocity.

FIGS. 17A to 17C are diagrams illustrating the velocity calculation results obtained by performing the bias estimation and the bias correction of the Z axis using the method according to this embodiment. The viewpoint is the same as FIGS. 16A to 16C but the scale of the vertical axis in FIG. 17C showing the velocity in the altitude direction is different from that of FIG. 16C.

In the inertial navigation according to this embodiment, great improvement is caused in the temporal variation of the velocity in the altitude direction, compared with the past method. That is, the error of the velocity in the altitude direction is accumulated with the passage of time in the past method, but it can be seen from FIG. 17C that the velocity in the altitude direction is maintained almost at "0 m/s" even with the passage of time. This is because the accumulation of the error in the velocity obtained by integrating the acceleration is prevented by performing the bias correction on the acceleration. Accordingly, the effectiveness of the method according to this embodiment is proved.

3. Operational Advantages

According to this embodiment, the virtual posture angle which is a posture angle with a bias which is assumed to be zero is calculated using the detection values of the plurality of axes when the multi-axis acceleration sensor has the calibration posture. The bias value contained in the detection value of the corresponding axis is estimated using the detection value of the axis parallel to the vertical direction and the virtual posture angle.

The detection values of the plural axes of the multi-axis acceleration sensor contain two components of a gravitational acceleration component in a detection axis direction and a bias component due to the posture of the acceleration sensor. It is difficult to specify by what ratios the detection values of the acceleration sensor contain the components. Accordingly, in this embodiment, the virtual posture angle which is a posture angle with a bias which is assumed to be zero is calculated and then the bias value contained in the corresponding detection value is estimated using the detection value of the detection axis parallel to the vertical direction and the calculated virtual posture angle. As a result, it is possible to separate the gravitational acceleration component and the bias component and thus to appropriately estimate the bias value.

However, the estimated bias values are only virtual bias values estimated using the virtual posture angle. Accordingly, the bias estimation error is calculated using the error variance of the bias values and the virtual posture angle. The bias estimation error depends on the inclination of the installation base on which the acceleration sensor is installed, and the bias estimation error decreases when the acceleration sensor is installed in the installation base closer to horizontal. Accordingly, by installing the acceleration sensor in the installation base which can be considered as horizontal and using the bias estimating method according to this embodiment, it is possible to calculate the estimated bias values close to the true bias values.

When the estimated bias values close to the true bias values are calculated, it is possible to correct the detection values of the acceleration sensor using the calculated estimated bias values. By calculating the posture angle using the corrected detection values of the acceleration sensor, it is possible to correctly estimate the posture of the acceleration sensor.

4. Modifications

Modifications of the invention will be described below. The elements common to the above-mentioned example are referenced by the same reference numerals as in the example and description thereof will not be repeated.

4-1. Electronic Apparatus

Although it has been described in the above-mentioned example that the invention is applied to the navigation apparatus mounted on a four-wheeled vehicle, the electronic apparatus to which the invention can be applied is not limited to this configuration. For example, the invention may be applied to a navigation apparatus mounted on a two-wheeled vehicle or may be applied to a portable navigation apparatus.

The invention may be similarly applied to electronic apparatuses of other applications, as long as they are electronic apparatuses equipped with the acceleration sensor. Similarly to the above-mentioned embodiment, the bias estimation, the bias correction and the posture estimation of the acceleration sensor can be performed on electronic apparatuses such as a mobile phone, a PC, and a PDA (Personal Digital Assistant) equipment with the acceleration sensor.

4-2. Processing Subject

In the above-mentioned example, it has been described that the processing unit of the navigation apparatus performs the bias estimation and the bias correction of the acceleration sensor. That is, in an electronic apparatus equipped with the acceleration sensor, the processor of the electronic apparatus performs the bias estimation and the bias correction.

However, the processing subject may be properly changed.

For example, although it has been described in the above-mentioned example that the IMU 70 does not include the processing unit, the IMU 70 may be configured as a sensor module including the processing unit. The processing unit of the IMU 70 may perform the bias estimation or the bias correction of the acceleration sensor. In this case, the sensor module itself performs the bias estimation and the bias correction.

The processing unit of the sensor module may perform the posture estimation of the acceleration sensor. The processing subject may be changed in the bias estimation and the posture estimation. For example, the bias estimation and the bias correction may be performed by the processing unit of the sensor module and the posture estimation may be performed by the processing unit of the electronic apparatus using the output value of the sensor module.

4-3. Temperature Compensation of Acceleration Sensor

In the above-mentioned embodiment, it has been described that the acceleration sensor is at least a temperature-compensated sensor. That is, it has been described that the acceleration sensor is completely subjected to the temperature compensation at the time of shipment of products. However, the temperature compensation may be performed after the shipment of products to compensate for the output of the acceleration sensor.

The temperature-dependent characteristic of the bias value can approximate to a mathematical model, for example, expressed by Expression (12).

$$b_T = b_0 + b_1 T + b_2 T^2 + \ldots \qquad (12)$$

In Expression (12), "T" represents the temperature and "$b_T$" in the left side represents the bias value at the temperature "T". In addition, "$b_0$, $b_1$, $b_2$, . . ." in the right side represent temperature correction coefficients corresponding to zeroth order, first order, second order, . . . of the temperature.

The temperature correction coefficients can be obtained by performing an experiment using a tester at the time of manufacturing the acceleration sensor. The temperature correction coefficients obtained through the experiment are stored in the storage unit of the sensor module including the acceleration sensor or the storage unit of the electronic apparatus equipped with the acceleration sensor.

Figure 18:
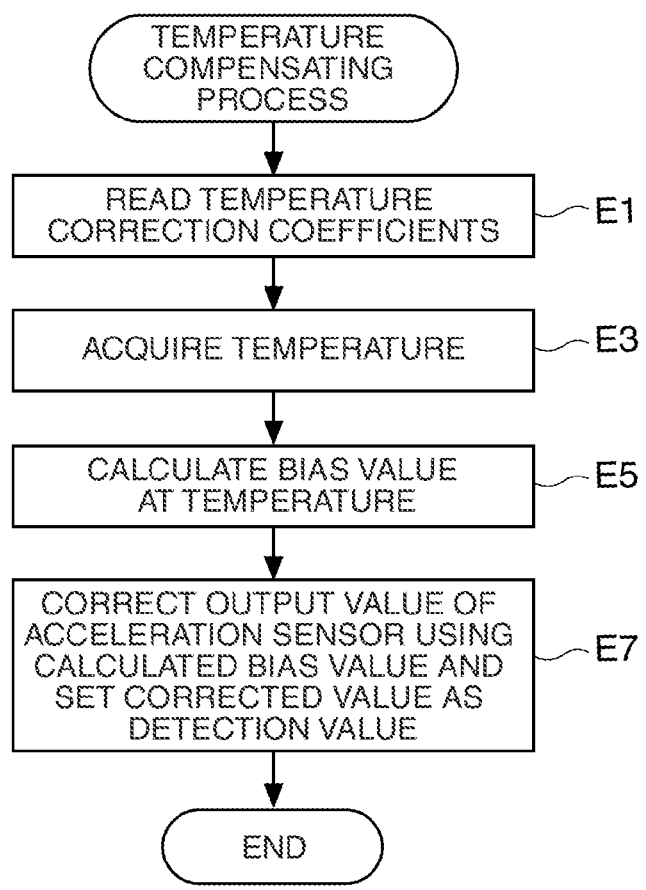
FIG. 18 is a flow diagram illustrating the flow of a temperature compensating process.

FIG. 18 is a flow diagram illustrating the flow of a temperature compensating process performed by the processing unit of the sensor module or the processing unit of the electronic apparatus.

First, the processing unit reads the temperature correction coefficients from the storage unit (step E1). The processing unit then acquires the current temperature (step E3). The temperature can be acquired by installing a temperature sensor in the sensor module or the electronic apparatus.

Subsequently, the processing unit calculates the bias value "$b_T$" at the temperature "T" acquired in step E3 using the approximation model of Expression (12) (step E5). Then, the processing unit corrects the output value of the acceleration sensor as the detection value using the calculated bias value "$b_T$" (step E7). The processing unit ends the temperature compensating process.

In this way, the temperature compensation may be first carried out and then the estimation and correction of the bias remaining in the detection value of the acceleration sensor may be carried out using the method according to this embodiment.

4-4. Error Compensation of Acceleration Sensor

The output of the acceleration sensor contains a misalignment error due to the inaccurate attachment of the acceleration sensor to the sensor module or an error component such as a different-axis sensitivity error due to the misalignment. Accordingly, it is preferable that the compensation of the error component can be carried out in addition to the temperature compensation and the bias estimation according to this embodiment can be carried out using the resultant detection value of the acceleration sensor.

4-5. Number of Axes of Acceleration Sensor

Although it has been described that the number of axes of the acceleration sensor is set to three, the number of axes may be greater than three. For example, the number of axes may be set to six by considering the positive and negative axis directions of each of three orthogonal axes as different axes, or the number of axes may be set to six by setting two types of orthogonal three-axis coordinate systems sharing only the origin in a twisted manner. An axis coordinate system other than the orthogonal axis coordinate system may be employed. The coordinate system is not particularly limited as long as it can three-dimensionally detect the acceleration, and thus the number of axes needs to be set to two or more (accurately three or more).

The entire disclosure of Japanese Patent Application No. 2010-146561, filed on Jun. 28, 2010 is expressly incorporated by reference herein.

What is claimed is:

1. A method for calibrating a multi-axis acceleration sensor using an estimation of a bias of the multi-axis acceleration sensor, the method comprising:
    placing the multi-axis acceleration sensor in a calibration posture having an unknown actual posture angle where one axis of the multi-axis acceleration sensor is parallel to the vertical direction;
    calculating a virtual posture angle of the multi-axis acceleration sensor placed in the calibration posture, wherein the virtual posture angle is an estimation of the actual posture angle and is calculated through the use of acceleration detection values of a plurality of axes of the multi-axis acceleration sensor measured by the multi-axis acceleration sensor by assuming a zero bias in the acceleration detection values, and the calculated virtual posture angle is different than the actual posture angle;
    estimating a bias value contained in the acceleration detection value of each axis of the plurality of axes using the acceleration detection value of the corresponding axis and the virtual posture angle; and
    calibrating the multi-axis acceleration sensor using the estimated bias value.

2. The method according to claim 1, further comprising calculating an estimation error of the bias value using the virtual posture angle and error variance of the bias value.

3. The method according to claim 2, wherein the estimation error of the bias value contained in the detection value of each axis of the plurality of axes can be approximated using the virtual posture angle and an error in the virtual posture angle, and
    wherein the calculating of the estimation error of the bias value includes calculating the estimation error of the bias value contained in the detection value of each axis of the plurality of axes on the basis of the fact that the error in the virtual posture angle can be estimated using the error variance of the bias value.

4. The method according to claim 1, wherein the acceleration sensor is at least a temperature-compensated sensor.

5. The method according to claim 1, further comprising performing at least a temperature compensating operation to compensate for the output of the acceleration sensor and to acquire the detection value.

6. A posture estimating method of estimating a posture of the acceleration sensor using the bias value estimated by the method according to claim 1 and the detection value of each axis of the plurality of axes of the acceleration sensor.

7. A device for calibrating a multi-axis acceleration sensor using an estimation of a bias of the multi-axis acceleration sensor, the device comprising:
    a virtual posture angle calculating unit that calculates a virtual posture angle of a multi-axis acceleration sensor placed in a calibration posture having an unknown actual posture angle where one axis of the multi-axis acceleration sensor is parallel to the vertical direction, wherein the virtual posture angle is an estimation of the actual posture angle and is calculated by the use of acceleration detection values of a plurality of axes of the multi-axis acceleration sensor measured by the multi-axis acceleration sensor by assuming a zero bias in the acceleration detection values, and the calculated virtual posture angle is different than the actual posture angle;
    a bias estimating unit that estimates a bias value contained in the acceleration detection value of each axis of the plurality of axes using the acceleration detection value of the axis and the virtual posture angle; and
    a calibration unit that calibrates the multi-axis acceleration sensor using the estimated bias value.

8. A posture estimating device comprising:
    a multi-axis acceleration sensor;
    the device according to claim 7 that estimates the bias value contained in the detection values of the plurality of axes of the acceleration sensor; and
    a posture estimating unit that estimates a posture of the acceleration sensor using the bias value estimated by the bias estimating device and the detection value of each axis of the plurality of axes of the acceleration sensor.

9. A device for calibrating a multi-axis acceleration sensor having a plurality of axes using an estimation of a bias of the multi-axis acceleration sensor, the device comprising:

an instruction unit that instructs a user to place the device in a calibration posture where the actual posture angle is unknown;

a calculating unit that calculates a virtual posture angle of a multi-axis acceleration sensor at the calibration posture using a detection value measured by a multi-axis acceleration sensor, wherein the calculated virtual posture angle is different than the actual posture angle;

a bias estimating unit that estimates a bias value contained in the detection value using the virtual posture angle and the detection value; and a calibration unit that calibrates the multi-axis acceleration sensor using the estimated bias value.

10. The device according to claim 9, wherein the calibration posture has one axis of the multi-axis acceleration parallel to the vertical direction.

11. The device according to claim 10, wherein the calculating unit calculates the virtual posture angle using the plurality of axes of the multi-axis acceleration sensor by assuming a zero bias.

12. The device according to claim 10, wherein the bias estimating unit estimates the bias value of the one axis.

13. The device according to claim 9, wherein the instruction unit instructs to place the device on a horizontal platform.

14. The device according to claim 9, wherein the instruction unit instructs again to place the device in the calibration posture if the inclination of the device is great.

15. The device according to claim 9, wherein the instruction unit includes a display or an audio.

\* \* \* \* \*